(12) United States Patent
Kim et al.

(10) Patent No.: US 11,310,798 B2
(45) Date of Patent: Apr. 19, 2022

(54) MEASUREMENT METHOD AND APPARATUS FOR SUPPORTING MOBILITY IN COMMUNICATION SYSTEM

(71) Applicant: ELECTRONICS AND TELECOMMUNICATIONS RESEARCH INSTITUTE, Daejeon (KR)

(72) Inventors: Cheul Soon Kim, Daejeon (KR); Sung Hyun Moon, Daejeon (KR); Jung Hoon Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 131 days.

(21) Appl. No.: 16/791,616

(22) Filed: Feb. 14, 2020

(65) Prior Publication Data

US 2020/0267730 A1 Aug. 20, 2020

(30) Foreign Application Priority Data

| Feb. 15, 2019 | (KR) | 10-2019-0017947 |
| May 31, 2019 | (KR) | 10-2019-0064847 |
| Jun. 21, 2019 | (KR) | 10-2019-0074449 |
| Oct. 1, 2019 | (KR) | 10-2019-0121702 |
| Nov. 8, 2019 | (KR) | 10-2019-0142809 |
| Nov. 20, 2019 | (KR) | 10-2019-0149816 |

(Continued)

(51) Int. Cl.
| *H04L 12/28* | (2006.01) |
| *H04W 72/04* | (2009.01) |
| *H04W 72/08* | (2009.01) |
| *H04W 74/08* | (2009.01) |
| *H04J 1/16* | (2006.01) |

(52) U.S. Cl.
CPC ... *H04W 72/0453* (2013.01); *H04W 72/0413* (2013.01); *H04W 72/085* (2013.01); *H04W 74/0808* (2013.01)

(58) Field of Classification Search
CPC ..... H04L 5/001; H04L 1/1614; H04L 1/1854; H04L 27/26025; H04W 16/14; H04W 72/04; H04W 72/0413; H04W 72/0453
USPC ......................................... 370/252, 329, 430
See application file for complete search history.

(56) References Cited

U.S. PATENT DOCUMENTS

| 10,064,174 B2 | 8/2018 | Wittenmark et al. |
| 2017/0251456 A1 | 8/2017 | Radulescu et al. |
| 2018/0262900 A1 | 9/2018 | Moon et al. |

(Continued)

FOREIGN PATENT DOCUMENTS

| WO | 2017/026980 A1 | 2/2017 |
| WO | 2017/196083 A1 | 11/2017 |
| WO | 2018/174550 A1 | 9/2018 |

*Primary Examiner* — John Pezzlo
(74) *Attorney, Agent, or Firm* — Rabin & Berdo, P.C.

(57) ABSTRACT

Disclosed are a measurement method and a measurement apparatus for supporting mobility in a communication system. An operation method of a terminal may comprise receiving, from a base station, control information including first information indicating one or more physical uplink shared channel (PUSCH) interlaces configured in an unlicensed band; identifying frequency resources corresponding to the one or more PUSCH interlaces; and transmitting a PUSCH to the base station using the frequency resources of the unlicensed band. Thus, the performance of the communication system can be improved.

17 Claims, 14 Drawing Sheets

(30) Foreign Application Priority Data

Jan. 30, 2020 (KR) ........................ 10-2020-0011186
Feb. 14, 2020 (KR) ........................ 10-2020-0018372

(56) References Cited

U.S. PATENT DOCUMENTS

| | | |
|---|---|---|
| 2019/0007897 A1 | 1/2019 | Ng et al. |
| 2019/0123850 A1 | 4/2019 | Dinan |
| 2019/0159255 A1 | 5/2019 | Zheng et al. |
| 2020/0137780 A1* | 4/2020 | Kim ...................... H04L 5/0051 |
| 2020/0177353 A1* | 6/2020 | Ding ..................... H04L 5/0094 |
| 2021/0329671 A1* | 10/2021 | Kim .................. H04W 72/0453 |

* cited by examiner

100

MULTIPLEXING PATTERN #1

MULTIPLEXING PATTERN #2

MULTIPLEXING PATTERN #3

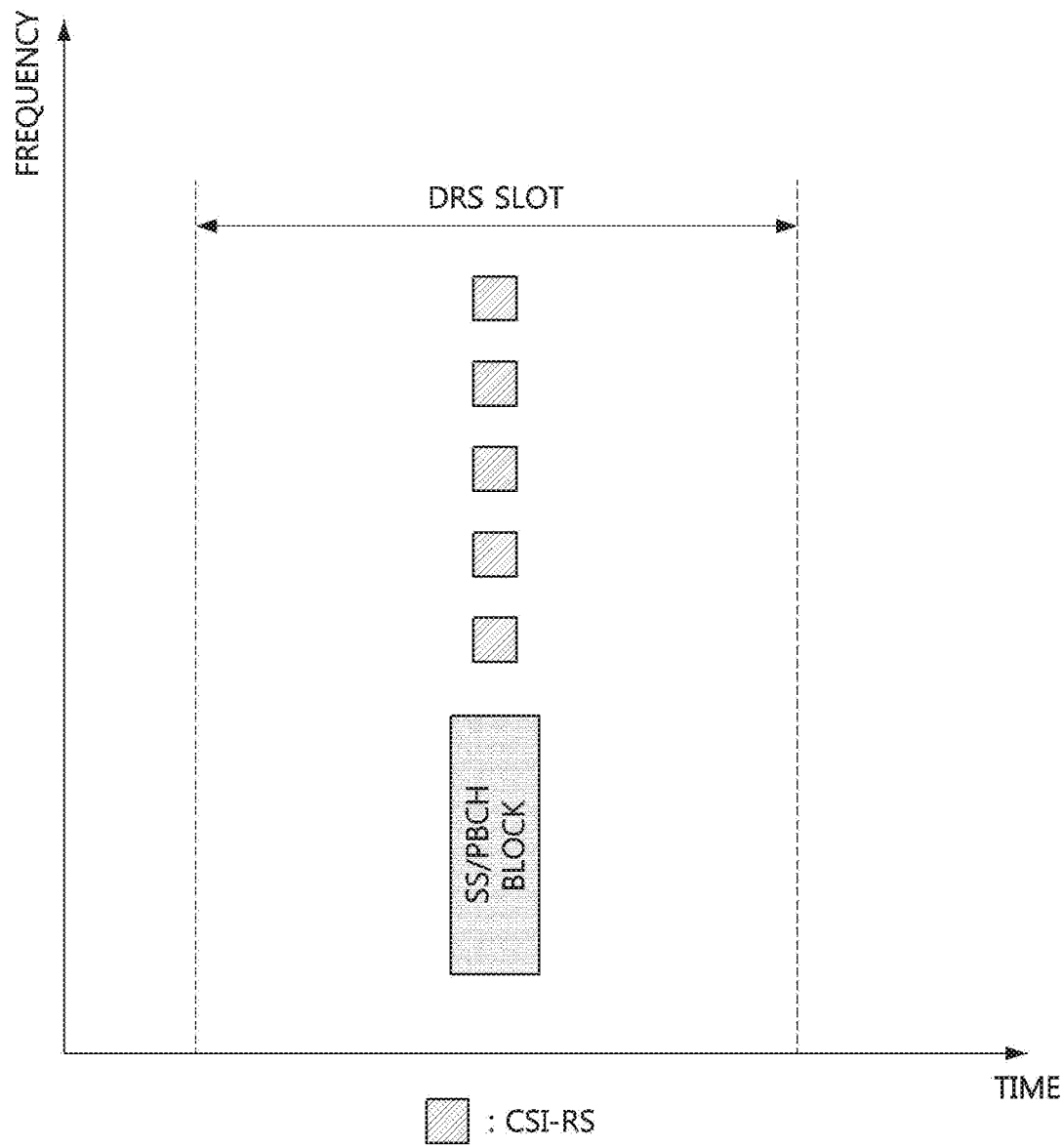

MEASUREMENT METHOD AND APPARATUS FOR SUPPORTING MOBILITY IN COMMUNICATION SYSTEM

CROSS-REFERENCE TO RELATED APPLICATIONS

This application claims priority to Korean Patent Applications No. 10-2019-0017947 filed on Feb. 15, 2019, No. 10-2019-0064847 filed on May 31, 2019, No. 10-2019-0074449 filed on Jun. 21, 2019, No. 10-2019-0121702 filed on Oct. 1, 2019, No. 10-2019-0142809 filed on Nov. 8, 2019, No. 10-2019-0149816 filed on Nov. 20, 2019, No. 10-2020-0011186 filed on Jan. 30, 2020, and No. 10-2020-0018372 filed on Feb. 14, 2020 with the Korean Intellectual Property Office (KIPO), the entire contents of which are hereby incorporated by reference.

BACKGROUND

1. Technical Field

The present disclosure relates measurement technologies in a communication system, and more specifically, to radio resource management (RRM) measurement technologies for supporting mobility.

2. Related Art

The communication system (hereinafter, a New Radio (NR) communication system) using a higher frequency band (e.g., a frequency band of 6 GHz or higher) than a frequency band (e.g., a frequency band of 6 GHz or lower) of the Long Term Evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like.

The NR communication system can simultaneously support one or more usage scenarios. In the NR communication system supporting one or more usage scenarios, configuration variables (e.g., numerology) of an orthogonal frequency division multiplexing (OFDM) waveform may be variously configured. Various numerologies can be used in the NR communication system. When a time division duplex (TDD) based NR communication system supports eMBB and URLLC, the low latency performance of URLLC needs to be improved.

In a procedure of transmitting downlink (DL) data, since a hybrid automatic repeat request (HARQ) response (e.g., acknowledgment (ACK) or negative ACK (NACK)) is required for the DL data, a delay time in the DL data transmission procedure may be determined according to an arrangement form of DL slots and uplink (UL) slots. Since transmission of an HARQ response to UL data is required in a procedure of transmitting the UL data, a delay time in the UL data transmission procedure may be determined according to the arrangement form of the DL slots and the UL slots.

In the NR communication system, a type of slot or symbol may be dynamically changed according to a situation. The terminal may identify whether the type of the symbol is a DL symbol, an UL symbol, or a flexible (FL) symbol. The FL symbol may be changed to a DL symbol or a UL symbol. There is a need for methods for efficiently performing radio resource management (RRM) in such the NR communication system.

SUMMARY

Accordingly, exemplary embodiments of the present disclosure provide a measurement method and a measurement apparatus for supporting mobility.

According to an exemplary embodiment of the present disclosure, an operation method of a terminal in a communication system may comprise receiving, from a base station, control information including first information indicating one or more physical uplink shared channel (PUSCH) interlaces configured in an unlicensed band; identifying frequency resources corresponding to the one or more PUSCH interlaces; and transmitting a PUSCH to the base station using the frequency resources of the unlicensed band.

The first information may be a bitmap, and each of bits included in the bitmap may indicate a PUSCH interlace allocated for the terminal.

The first information may be an index, and the index may indicate a combination of the one or more PUSCH interlaces allocated for the terminal.

The index may include information indicating a starting PUSCH interlace among the one or more PUSCH interlaces and information indicating a number of the one or more PUSCH interlaces.

A scheme of indicating the one or more PUSCH interlaces may depend on a subcarrier spacing of a bandwidth part (BWP) to which the one or more PUSCH interlaces belong.

The control information may further include second information indicating one or more resource block (RB) sets configured by the base station, wherein each of the one or more RB sets includes one or more RBs.

The one or more RB sets may be frequency resources indicated by the base station.

The second information may be a bitmap, and each of bits included in the bitmap may indicate an RB set allocated for the terminal.

When a plurality of RB sets is configured by the base station, a guard band may be located between the plurality of RB sets, and the PUSCH may be mapped to one or more RBs belonging to the plurality of RB sets.

The PUSCH may be transmitted in the one or more PUSCH instances belonging to the one or more RB sets and in the one or more PUSCH instances belonging to RBs other than the one or more RB sets, and a type of listen-before-talk (LBT) operation performed for transmission of the PUSCH in the one or more RB sets may be different from a type of LBT operation performed for transmission of the PUSCH in the RBs other than the one or more RB sets.

The PUSCH may be transmitted in a channel occupancy time (COT) configured by the base station and a time interval other than the COT, and a type of LBT operation performed for the transmission of the PUSCH in the COT may be different from a type of LBT operation performed for the transmission of the PUSCH in the time interval other than the COT.

A time interval in which the PUSCH can be transmitted may include a plurality of PUSCH instances, and when one or more PUSCH instances among the plurality of PUSCH instances do not belong to a COT configured by the base station, the PUSCH may not be transmitted in the time interval.

A time interval in which the PUSCH can be transmitted may include a plurality of PUSCH instances, and when one or more PUSCH instances among the plurality of PUSCH instances do not belong to a COT configured by the base station, the PUSCH may be transmitted in remaining PUSCH instances except the one or more PUSCH instances among the plurality of PUSCH instances.

The control information may include third information indicating a structure of one or more slots included in a COT configured by the base station, and the third information included in different control information received from the base station may indicate a same slot structure.

According to another exemplary embodiment of the present disclosure, an operation method of a base station in a communication system may comprise generating first information indicating one or more physical uplink shared channel (PUSCH) interlaces configured in an unlicensed band; transmitting control information including the first information to a terminal; and receiving a PUSCH from the terminal using frequency resources corresponding to the one or more PUSCH interlaces in the unlicensed band.

The first information may be a bitmap or an index, and a scheme of indicating the one or more PUSCH interlaces may be different according to a subcarrier spacing of a bandwidth part (BWP) to which the one or more PUSCH interlaces belong.

The index may include information indicating a starting PUSCH interlace among the one or more PUSCH interlaces and information indicating a number of the one or more PUSCH interlaces.

The control information may further include second information indicating one or more resource block (RB) sets configured by the base station, each of the one or more RB sets may include one or more RBs, and the one or more RB sets may be frequency resources of a channel occupancy time (COT) configured by the base station.

When a plurality of RB sets is configured by the base station, a guard band may be located between the plurality of RB sets, and the PUSCH may be mapped to one or more RBs belonging to the plurality of RB sets.

The PUSCH may be received in the one or more PUSCH instances belonging to the one or more RB sets and in the one or more PUSCH instances belonging to RBs other than the one or more RB sets, and a type of listen-before-talk (LBT) operation performed for transmission of the PUSCH in the one or more RB sets may be different from a type of LBT operation performed for transmission of the PUSCH in the RBs other than the one or more RB sets.

According to the exemplary embodiments of the present disclosure, a channel state information-reference signal (CSI-RS) resource may be used as a radio resource management (RRM)-RS resource or a tracking reference signal (TRS) resource. Accordingly, the terminal may perform an RRM measurement operation or a DL management operation based on a reference signal received through the CSI-RS resource. In addition, the base station may inform the terminal of zero power (ZP) resource information and/or non-ZP (NZP) resource information. The terminal may perform a rate matching operation or a puncturing operation for a data channel based on the ZP resource information and/or the NZP resource information obtained from the base station.

In addition, the base station may transmit a channel occupancy time (COT) indicator indicating time resource information and frequency resource information of a COT to the terminal. The terminal may identify a resource structure of the COT secured by the base station based on the COT indicator, and may perform a DL reception operation and/or a UL transmission operation based on the resource structure of the COT. Thus, the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which:

FIG. 5B is a conceptual diagram illustrating a fourth exemplary embodiment of a method of multiplexing an SS/PBCH block and a CSI-RS in a DRS slot of a communication system;

Figure 1:
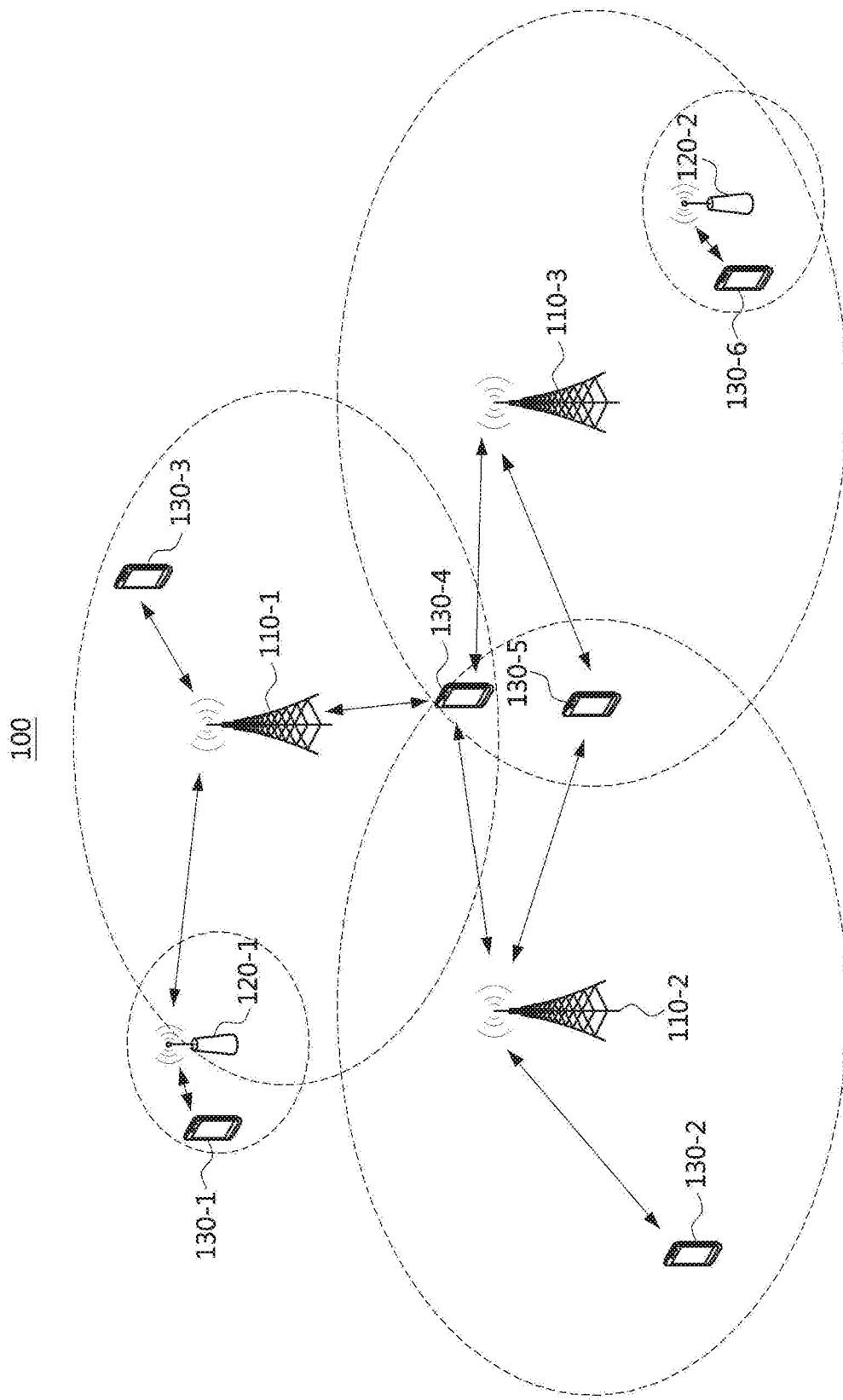
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g., long term evolution (LTE) or LTE-Advanced (LTE-A)), 5G communication (e.g., new radio (NR)), or the like as defined in the 3rd generation partnership project (3GPP) technical specification. The 4G communication may be performed in a frequency band of 6 GHz or below, and the 5G communication may be performed in a frequency band of 6 GHz or above as well as the frequency band of 6 GHz or below.

For example, for the 4G and 5G communications, the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, and the like.

In addition, the communication system 100 may further include a core network. When the communication system 100 supports 4G communication, the core network may include a serving-gateway (S-GW), a packet data network (PDN) gateway (P-GW), a mobility management entity (MME), and the like. When the communication system 100 supports 5G communication, the core network may include a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
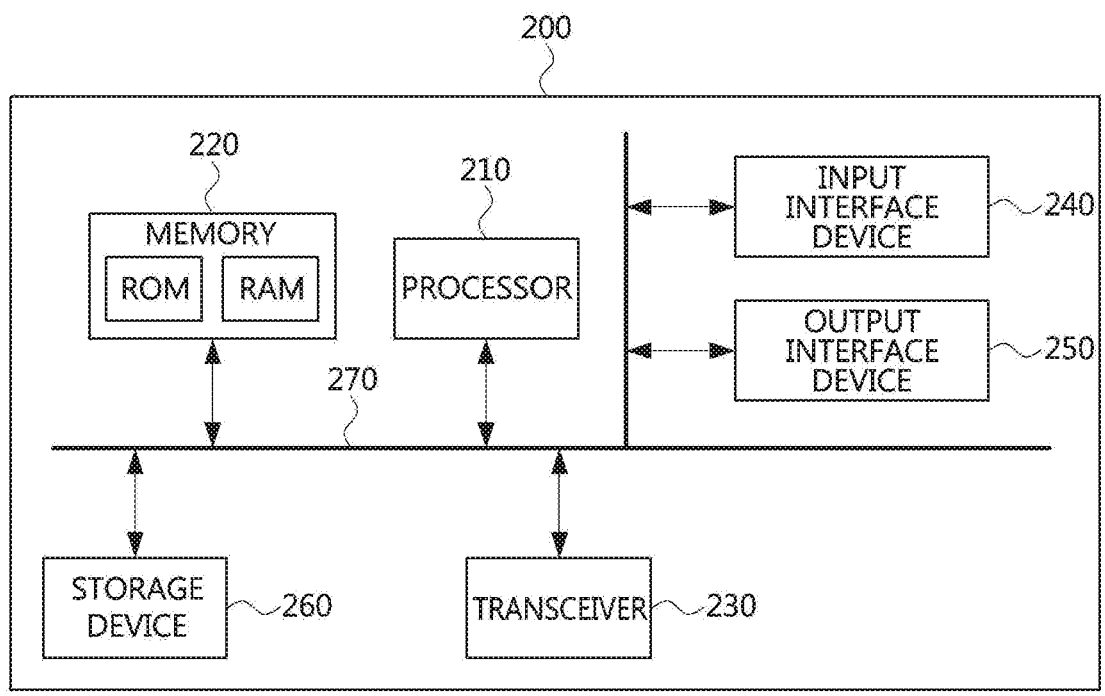
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, the respective components included in the communication node 200 may be connected through a separate interface or a separate bus around the processor 210 instead of the common bus 270. For example, the processor 210 may be connected to at least one of the memory 220, the transceiver 230, the input interface device 240, the output interface device 250, and the storage device 260 through a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

In the following description, measurement methods in the communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

In the following exemplary embodiments, the base station may mean a serving base station, and the terminal may mean a terminal connected to the serving base station. The higher layer signaling operation may be an operation of exchanging a radio resource control (RRC) message including configuration information, which is performed between the base station and the terminal.

In the communication system, the base station may periodically transmit a reference signal. The terminal may receive the reference signal from the base station, and determine a quality of a radio link between the base station and the terminal based on a measurement result of the reference signal. The base station may measure channel state information (CSI) to perform scheduling according to a dynamic quality of the radio link. The base station may measure a reference signal received power (RSRP), a reference signal received quality (RSRQ), a signal to interference plus noise ratio (SINR), etc. to support mobility according to a static quality of the radio link.

The communication system may operate in an unlicensed band. In this case, a transmitter may determine whether radio resources are used by another communication node by performing a measurement operation (e.g., sensing operation) on the corresponding radio resources. In a DL communication procedure, the transmitter may be a base station, and in a UL communication procedure, the transmitter may be a terminal. A radio access technology (RAT) of the transmitter may be the same as or different from that of another communication node. If there is not another communication node using the radio resources, the transmitter may transmit a signal and/or a channel using the radio resources. If there is another communication node using the radio resources, the transmitter may not transmit a signal and/or a channel using the radio resources. Regulation on the unlicensed band may not guarantee that one transmitter periodically transmits signals and/or channels. Accordingly, the transmitter may transmit signals and/or channels aperiodically by performing the sensing operation.

In the communication system supporting a licensed band, the reference signal may be transmitted periodically. In this case, mobility of the terminal can be stably supported. For example, the terminal may perform an RRM measurement operation based on the reference signal, and inform the base station of the RRM measurement result. The base station may support the mobility of the terminal based on the RRM measurement result. In addition, the terminal may perform a CSI measurement operation based on the reference signal, and may inform the base station of the CSI measurement result. The base station may perform a dynamic scheduling operation based on the CSI measurement result. In addition, a time offset and a frequency offset may be canceled based on the measurement result of the tracking reference signal (TRS). However, since the base station may not transmit the reference signal according to a result of the sensing operation, the above-described operations may not be performed in the unlicensed band. In this case, the terminal may not perform the operations based on the reference signal.

It may not be guaranteed to periodically perform the RRM measurement operation in the unlicensed band. In addition, it may not be guaranteed that the terminal periodically receives a synchronization signal for an initial access operation (e.g., cell search operation) in the unlicensed band. According to the 3GPP technical specification, the base station may inform the terminal of locations of approximate time resources in which a synchronization signal/physical broadcast channel (SS/PBCH) block is transmitted. The terminal may receive the synchronization signal (e.g., SS/PBCH block) without prior information.

The CSI-RS may be used as an RRM-RS or a TRS. After a radio resource control (RRC) connection between the terminal and the base station is completed, the terminal may receive the CSI-RS from the base station. The base station may inform the terminal of frequency resources, sequence resources, and locations of approximate time resources for transmission of the CSI-RS. However, the base station may not inform the terminal of locations of precise time resources for the CSI-RS transmission. The base station may configure a search time interval of a discovery reference signal (DRS) block in the unlicensed band to the terminal. The search time interval of the DRS block may include one or more slots or one or more subframes.

That is, the terminal may obtain location information of approximate time resources (e.g., search time interval of DRS block) for CSI-RS reception from the base station in an explicit or implicit manner. The approximate time resources for CSI-RS reception may refer to contiguous slots or contiguous subframes in the time domain. For example, the length of the approximate time resources for CSI-RS reception may be 5 milliseconds (ms). The terminal may receive the reference signal (e.g., CSI-RS) in one or more slots among slots (e.g., DRS slots) belonging to the approximate time resources for CSI-RS reception. The base station may perform a listen-before-talk (LBT) operation in the DRS slots. The base station may not transmit the reference signal in all DRS slots according to a result of performing the LBT operation.

DRS Composition

The DRS slot may be classified into a DRS slot including only the DRS and a DRS slot including both the DRS and data. The base station may perform a short LBT operation in the DRS slot including only the DRS, and may perform a long LBT operation in the DRS slot including both the DRS and the data. In addition, the base station may select configuration variables used for the LBT operation according to an access priority of the data. The terminal may not know the type of LBT operation (e.g., short LBT operation or long LBT operation) performed by the base station and configuration variables for the LBT operation. Therefore, the DRS slot may have the same configuration regardless of whether the DRS and the data are multiplexed or not.

The SS/PBCH block may be transmitted according to various subcarrier spacings (e.g., 15 kHz, 30 kHz, etc.). The subcarrier spacing of the SS/PBCH block may be different from a subcarrier spacing of another signal and/or channel transmitted through the DRS slot. The another signal transmitted through the DRS slot may be a CSI-RS. The another channel transmitted through the DRS slot may be a physical downlink control channel (PDCCH) (e.g., control resource set (CORESET)), a physical downlink shared channel (PDSCH), or the like.

The SS/PBCH block, a CORESET 0, and a system information block (SIB) type 1 may be multiplexed. The SIB type 1 may be a remaining minimum system information (RMSI) block. A multiplexing pattern may be defined as follows.

Figure 3A:
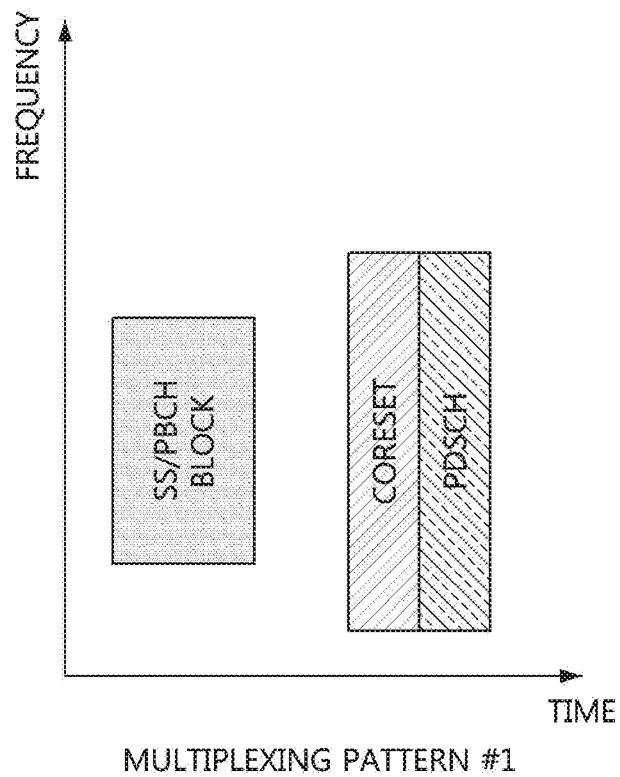
FIG. 3A is a conceptual diagram illustrating a multiplexing pattern #1 of an SS/PBCH block, a CORESET 0, and an SIB type 1 in a communication system.
Figure 3B:
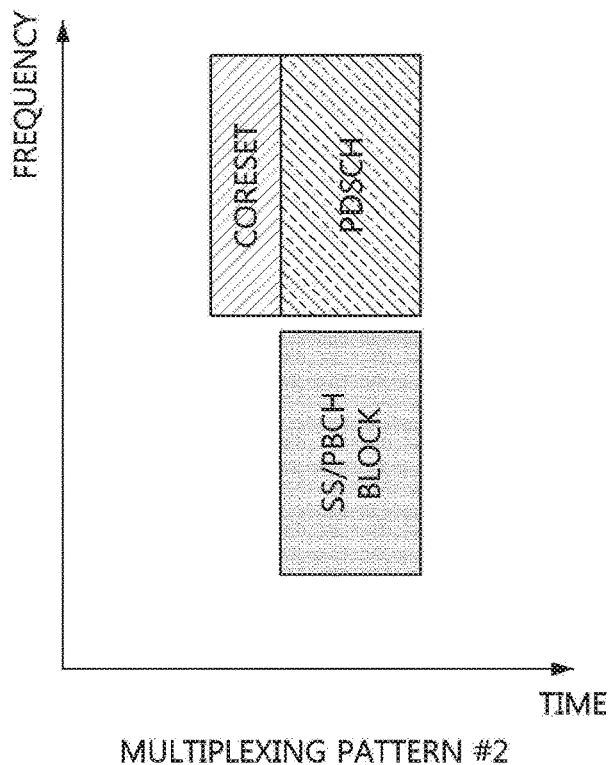
FIG. 3B is a conceptual diagram illustrating a multiplexing pattern #2 of an SS/PBCH block, a CORESET 0, and a SIB type 1 in a communication system.
Figure 3C:
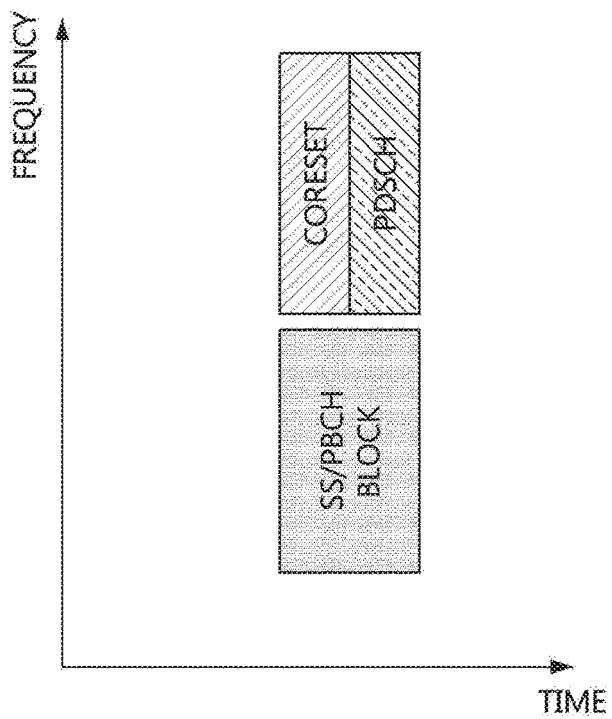
FIG. 3C is a conceptual diagram illustrating a multiplexing pattern #3 of an SS/PBCH block, a CORESET 0, and a SIB type 1 in a communication system.

FIG. 3A is a conceptual diagram illustrating a multiplexing pattern #1 of an SS/PBCH block, a CORESET 0, and an SIB type 1 in a communication system, FIG. 3B is a conceptual diagram illustrating a multiplexing pattern #2 of an SS/PBCH block, a CORESET 0, and an SIB type 1 in a communication system, and FIG. 3C is a conceptual diagram illustrating a multiplexing pattern #3 of an SS/PBCH block, a CORESET 0, and an SIB type 1 in a communication system.

Referring to FIGS. 3A to 3C, the CORESET may be a CORESET 0 and the SIB Type 1 (e.g., RMSI block) may be transmitted on a PDSCH. In the multiplexing pattern #1, the SS/PBCH block may be multiplexed with "CORESET 0 and RMSI block" in a time division multiplexing (TDM) scheme. In the multiplexing pattern #2, symbols in which the SS/PBCH block is located may be different from symbol(s) in which the CORESET 0 is located, and the SS/PBCH block may be multiplexed with the RMSI block in a frequency division multiplexing (FDM) scheme. In the multiplexing pattern #3, the SS/PBCH block may be multiplexed with the RMSI block in a FDM scheme. In this case, data may be multiplexed in the DRS slot.

In the following exemplary embodiments, a method of multiplexing the CSI-RS and the SS/PBCH block will be described. Here, the CSI-RS may be used as an RRM-RS or a TRS. The DRS may include one or more SS/PBCH blocks and one or more CSI-RSs. That is, the DRS slot may include resources for one or more SS/PBCH blocks and resources for one or more CSI-RSs. The SS/PBCH block may include a synchronization signal(s) and a PBCH. The synchronization signal may include a primary synchronization signal (PSS) and a secondary synchronization signal (SSS).

Figure 4A:
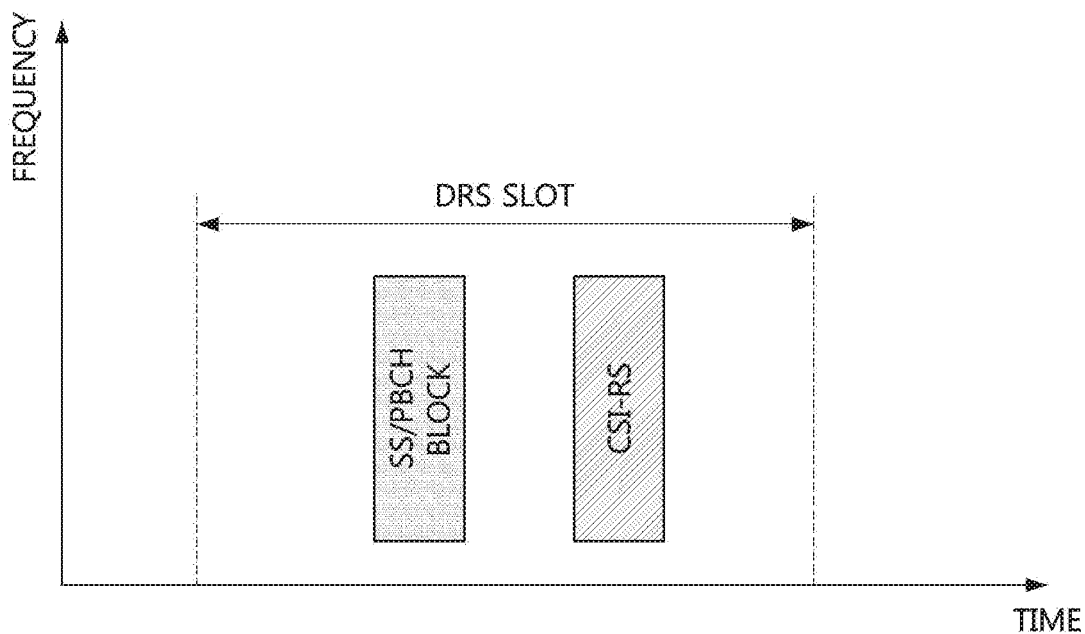
FIG. 4A is a conceptual diagram illustrating a first exemplary embodiment of a method of multiplexing an SS/PBCH block and a CSI-RS in a DRS slot of a communication system.
Figure 4B:
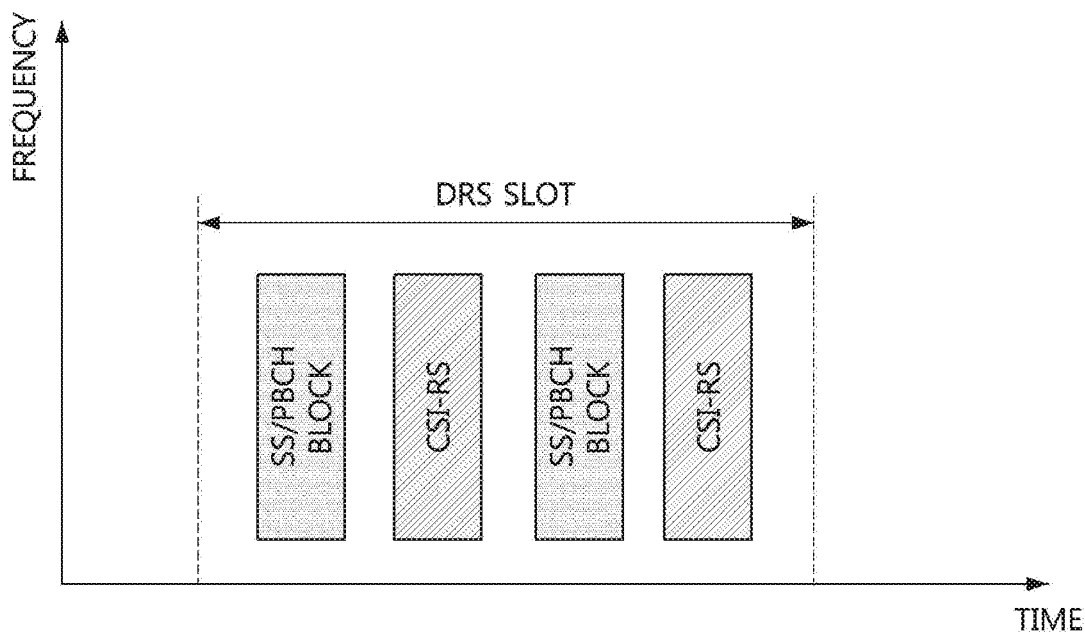
FIG. 4B is a conceptual diagram illustrating a second exemplary embodiment of a method of multiplexing an SS/PBCH block and a CSI-RS in a DRS slot of a communication system.

FIG. 4A is a conceptual diagram illustrating a first exemplary embodiment of a method of multiplexing an SS/PBCH block and a CSI-RS in a DRS slot of a communication system, and FIG. 4B is a conceptual diagram illustrating a second exemplary embodiment of a method of multiplexing an SS/PBCH block and a CSI-RS in a DRS slot of a communication system.

Referring to FIG. 4A, one SS/PBCH block may be multiplexed with one CSI-RS within one DRS slot in a TDM scheme. Referring to FIG. 4B, a plurality of SS/PBCH blocks may be multiplexed with a plurality of CSI-RSs within one DRS slot in a TDM scheme. The locations of the SS/PBCH block and the CSI-RS within the DRS slot may be variously configured. The symbol(s) where the CSI-RS is located may not overlap with the symbol(s) where the SS/PBCH block is located.

In the frequency domain, the SS/PBCH block may be located at the middle or the edge of the bandwidth part (BWP) to which the CSI-RS is mapped. The base station may configure CSI-RS resource(s) to the terminal using higher layer signaling. In the time domain, the SS/PBCH block may be located before the CSI-RS. Alternatively, the SS/PBCH block may be located after the CSI-RS in the time domain. The symbols where the SS/PBCH block is located may be contiguous with the symbol(s) where the CSI-RS is located. Alternatively, the symbols where the SS/PBCH block is located may not be contiguous with the symbol(s) where the CSI-RS is located. When the symbols where the SS/PBCH block is located are not contiguous with the symbol(s) where the CSI-RS is located, the base station may transmit another signal and/or channel (e.g., data channel) in a symbol(s) not occupied by the SS/PBCH block or the CSI-RS within the DRS slot to satisfy the spectrum regulation.

When the SS/PBCH block is multiplexed with the CSI-RS in a TDM scheme, a method of further multiplexing an RMSI block within the DRS slot may be considered. Downlink control information (DCI) (e.g., a cyclic redundancy check (CRC) of the DCI) that schedules a PDSCH on which the RMSI block is transmitted may be scrambled by a cell-radio network temporary identifier (C-RNTI), a modulation and coding scheme (MCS) C-RNTI (MCS-C-RNTI), a system information (SI) RNTI (SI-RNTI), or a configured scheduling (CS) RNTI (CS-RNTI). Alternatively, the DCI (e.g., the CRC of the DCI) scheduling the PDSCH on which the RMSI block is transmitted may be scrambled by a system information (SI) RNTI (SI-RNTI), a paging RNTI (P-RNTI), or a random access RNTI (RA-RNTI).

A terminal operating in an RRC connected state may receive the PDSCH (e.g., RMSI block) from the base station. In this case, the PDSCH may be assigned by a DCI format 1_0 (e.g., DCI-1_0) or a DCI format 1_1 (e.g., DCI-1_1).

The PDSCH (e.g., PDSCH-1_1) dynamically assigned by the DCI-1_1 may include zero power (ZP) resources. In this case, the terminal may assume that PDSCH-1_1 is not mapped to resource elements (REs) (e.g., ZP resources) indicated by the base station, and may performing a decoding operation on the PDSCH-1_1 under the assumption.

On the other hand, the PDSCH (e.g., PDSCH-1_0) assigned by the DCI-1_0 may not include ZP resources. In this case, the terminal may assume that the PDSCH-1_0 is mapped to resources other than the exception resources (e.g., resources in which the SS/PBCH block is transmitted) defined in the 3GPP technical specification, and may perform a decoding operation on the PDSCH-1_0 under the assumption.

The terminal may not know the location of the CSI-RS resource in the PDSCH-1_0 including the RMSI block. Accordingly, the CSI-RS may be located in symbol(s) different from the symbols occupied by the PDSCH-1_0. That is, the base station may schedule the PDSCH-1_0 such that the symbols occupied by PDSCH-1_0 are different from the symbol(s) occupied by the CSI-RS. In addition, the base station may inform the terminal of the locations of the CSI-RS resources.

Two SS/PBCH blocks having a subcarrier spacing of 15 kHz may be located in a DRS slot having a length of 1 ms. The DRS slot may include 14 symbols, and the SS/PBCH block and the CSI-RS may be located in 7 consecutive symbols among the 14 symbols. The RMSI block may also be located in the DRS slot. According to the multiplexing pattern #1 shown in FIG. 3A, the SS/PBCH block may be multiplexed with the RMSI block in a TDM scheme, the SS/PBCH block may occupy four symbols, and the RMSI block may occupy four symbols. In this case, considering the symbols occupied by the CSI-RS, the number of symbols required for multiplexing the SS/PBCH block, the RMSI block, and the CSI-RS may be greater than seven. When seven consecutive symbols in the DRS slot are used, the RMSI block for one SS/PBCH block may be transmitted in the corresponding seven consecutive symbols. Alternatively, when the location of the SS/PBCH block is changed and the CSI-RS is mapped to one symbol, the SS/PBCH block and the CSI-RS may be located within a half slot.

One DRS slot may include two SS/PBCH blocks and one RMSI block. Here, two SS/PBCH blocks may occupy eight symbols, and one RMSI block may occupy four symbols. In this case, 12 symbols among 14 symbols constituting one DRS slot may be used. The CSI-RS may be mapped to the remaining two symbols in the DRS slot. The above-described constraint may not apply to the case in which the base station assigns the PDSCH-1_1. In addition, the above-described constraint may not apply to the case in which the base station assigns the PDSCH-1_0 to another slot. In a proposed method, the PDSCH-1_0 may be mapped to resources (e.g., REs, or symbols) other than the CSI-RS resource.

In a proposed method, the CSI-RS may be multiplexed with the SS/PBCH block in the DRS slot in a 1-DM scheme. The symbol(s) occupied by the CSI-RS may overlap with the symbols occupied by the SS/PBCH block. The base station may not map the CSI-RS to the REs to which the SS/PBCH block is mapped. The CSI-RS may be used as a TRS or an RRM-RS. The terminal operating in the RRC connected state may receive system information from the base station, and may identify time and frequency resources in which the SS/PBCH block is transmitted based on the system information. Accordingly, the terminal may assume that the CSI-RS is mapped to the RE(s) not occupied by the SS/PBCH block.

Figure 5A:
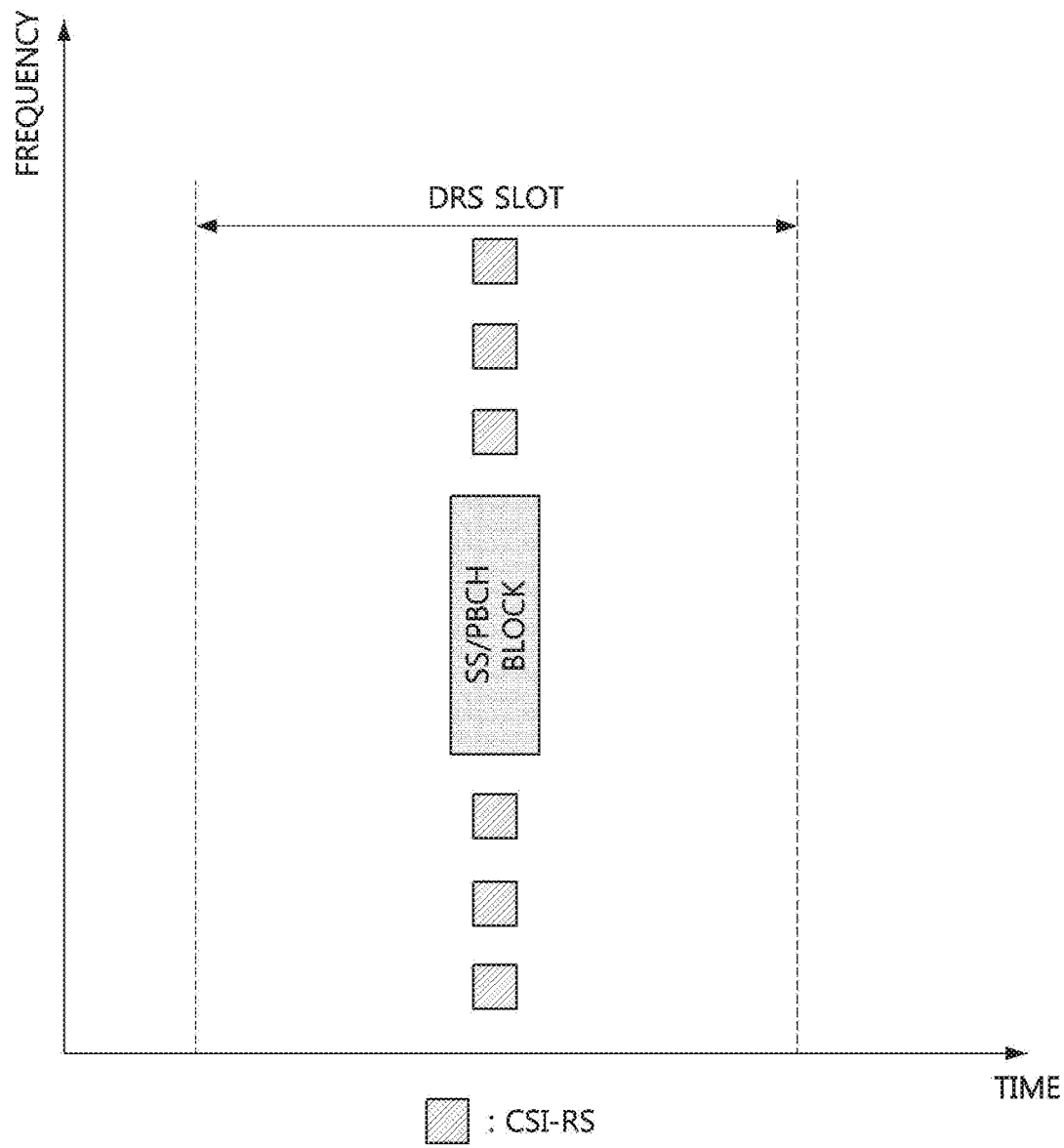
FIG. 5A is a conceptual diagram illustrating a third exemplary embodiment of a method of multiplexing an SS/PBCH block and a CSI-RS in a DRS slot of a communication system.

FIG. 5A is a conceptual diagram illustrating a third exemplary embodiment of a method of multiplexing an SS/PBCH block and a CSI-RS in a DRS slot of a communication system, and FIG. 5B is a conceptual diagram illustrating a fourth exemplary embodiment of a method of multiplexing an SS/PBCH block and a CSI-RS in a DRS slot of a communication system.

Referring to FIGS. 5A and 5B, one SS/PBCH block may be multiplexed with a CSI-RS within a DRS slot. When two or more SS/PBCH blocks are located in the DRS slot, each of the two or more SS/PBCH blocks may overlap the CSI-RS. The locations of the SS/PBCH block and the CSI-RS in the DRS slot may be variously configured. In the exemplary embodiment shown in FIG. 5A, the SS/PBCH block may be located in the middle of the BWP. In this case, in the frequency domain, the CSI-RS may be located in an upper region and a lower region of the SS/PBCH block. In the exemplary embodiment shown in FIG. 5B, the SS/PBCH block may be located at the edge of the BWP. In this case, in the frequency domain, the CSI-RS may be located in an upper region or a lower region of the SS/PBCH block.

In consideration of data transmission, the terminal may not know the location of the CSI-RS resource in the PDSCH-1_0 including the RMSI block. Accordingly, the CSI-RS may be located in symbol(s) different from the symbols occupied by the PDSCH-1_0. That is, the base station may schedule the PDSCH-1_0 such that symbols occupied by the PDSCH-1_0 are different from the symbol(s) occupied by the CSI-RS. Meanwhile, in the multiplexing pattern #1 shown in FIG. 3A, the RMSI block (e.g., PDSCH-1_0) may be multiplexed with the SS/PBCH block in a TDM scheme. Accordingly, the PDSCH-1_0 may be multiplexed with the CSI-RS in the DRS slot in a TDM scheme.

Method of Configuring a TRS Resource

The CSI-RS may be used as a TRS. In this case, the TRS resource may be used as the CSI-RS resource. The terminal operating in the RRC connected state may receive a wideband reference signal and may manage synchronization for downlink using the wideband reference signal in the time and frequency domain. Here, the wideband reference signal may mean a reference signal transmitted through a wideband. The TRS resource may be one example of the CSI-RS resource. The TRS may be transmitted periodically or aperiodically.

In a proposed method, a resource (e.g., CSI-RS resource) for DRS measurement may be configured in the terminal independently of the TRS resource. The base station may inform the terminal of information of approximate time resources (e.g., TRS measurement time configuration (TMTC) information) for TRS measurement using higher layer signaling. The approximate time resources may consist of one or more slots or one or more subframes, and among the one or more slots or one or more subframes, there may be a slot(s) or subframe(s) in which the TRS resource is configured. The base station may transmit the TRS by performing an LBT operation, the TRS may not be transmitted in a specific slot or a specific subframe depending on a result of performing the LBT operation. The base station may inform the terminal of information of a time window including candidate slots (or candidate subframes) in which the TRS can be transmitted. Here, the time window for the TRS measurement may be referred to as TMTC.

In a proposed method, a time window (e.g., DRS measurement time configuration (DMTC)) for the DRS measurement may include the TMTC. The base station may inform the terminal of information (e.g., DMTC information) of approximate time resources for the DRS measurement using higher layer signaling. The approximate time resources may include one or more slots or one or more subframes. The DMTC information may include the TMTC information. The terminal may derive the time resource(s) in which the TRS is transmitted from the DRS slot.

Time Resources of TRS

The TRS resource may be the CSI-RS resource. The TRS may have one antenna port and may be repeatedly transmitted in a plurality of symbols. The location of a symbol in which the TRS is transmitted (hereinafter, referred to as a 'TRS symbol') may be defined within a slot. The location of the TRS symbol may be changed according to configuration. For example, within one slot, the TRS may be mapped to a symbol #4 (e.g., fifth symbol) and a symbol #8 (e.g. ninth symbol), a symbol #5 (e.g., sixth symbol) and a symbol #9 (e.g., tenth symbol), and/or a symbol #6 (e.g., seventh symbol) and a symbol #10 (e.g., eleventh symbol). The spacing between the TRS symbols may be four symbols. The base station may inform the terminal of the location of the first TRS symbol in the slot. The terminal may estimate the location of the remaining TRS symbol(s) based on the spacing between the TRS symbols and the location of the first TRS symbol.

One slot may consist of a half slot #1 and a half slot #2. When one slot includes symbols #0 to #13, the half slot #1 may include the symbols #0 to #6 and the half slot #2 may include the symbols #7 to #13. The last symbol (e.g., symbol #6) of the half slot #1 and the last slot (e.g., symbol #13) of the half slot #2 may be configured as the TRS symbols. In this case, the base station may inform the terminal of the location of the first TRS symbol. The terminal may estimate the locations of the remaining TRS symbol(s) based on the location of the first TRS symbol.

The TRS may be multiplexed with the SS/PBCH block. In one slot, the TRS may be mapped in units of two symbols. The TRS may be multiplexed with the SS/PBCH block in the same slot. That is, the TRS and SS/PBCH block may be transmitted in the same slot.

In a proposed method, the SS/PBCH block may be multiplexed with the TRS in a FDM scheme. In this case, the TRS may not be mapped to the REs occupied by the SS/PBCH block. Accordingly, the terminal may assume that the TRS is not mapped to some physical resource blocks (PRBs) of a specific TRS symbol, and assume that the TRS is mapped to all PRBs of the remaining TRS symbol(s).

Figure 6:
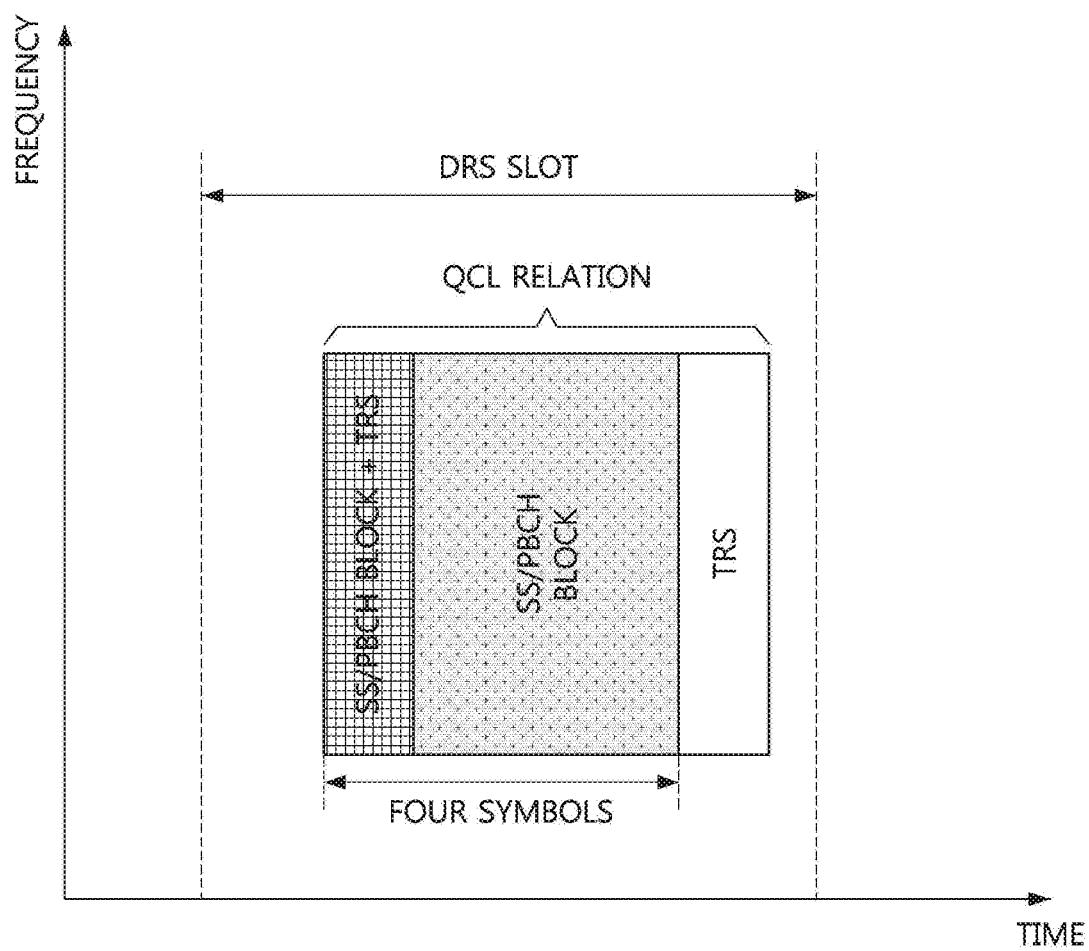
FIG. 6 is a conceptual diagram illustrating a first exemplary embodiment of a method of arranging a TRS in a communication system.

FIG. 6 is a conceptual diagram illustrating a first exemplary embodiment of a method of arranging a TRS in a communication system.

Referring to FIG. 6, the first symbol of the SS/PBCH block may overlap the TRS symbol. The TRS symbol may be located in an arbitrary symbol among symbols to which the SS/PBCH block is mapped according to configuration of the base station. Alternatively, the TRS symbol may be located in a specific symbol among the symbols to which the SS/PBCH block is mapped. When the spacing between the TRS symbols is four symbols, there may be one symbol overlapping the TRS symbol among the symbols to which the SS/PBCH block is mapped. The TRS symbol may not be located consecutively with the SS/PBCH block. In one DRS slot, the SS/PBCH block and the TRS may have a quasi-co-location (QCL) relation.

In a proposed method, the TRS may be multiplexed with the SS/PBCH block in a TDM scheme. To this end, the spacing between the TRS symbols and the location of the starting TRS symbol among the TRS symbols may be changed. For example, the spacing between the TRS symbols may be extended to five symbols. In this case, four symbols may be present between the TRS symbols, and the SS/PBCH block may be located between the TRS symbols. Accordingly, the base station may allocate a TRS resource (e.g., TRS symbol) before the starting symbol of the SS/PBCH block. When the SS/PBCH block occupies from the symbol #n to the symbol #n+3, the base station may configure the symbol #n−1 and the symbol #n+4 as the TRS resources. Here, n may be a natural number equal to or greater than 1. n may be defined in the 3GPP technical specification. The base station may inform the terminal of the location information (e.g., n−1) of the TRS resource through a combination of one or more among an RRC message, a MAC control element (CE), and downlink control information (DCI). Alternatively, the terminal may derive the location of the TRS resource based on information obtained through a decoding operation on the SS/PBCH block or the RMSI block (e.g., the starting symbol index n of the SS/PBCH block, a physical cell identifier).

Figure 7:
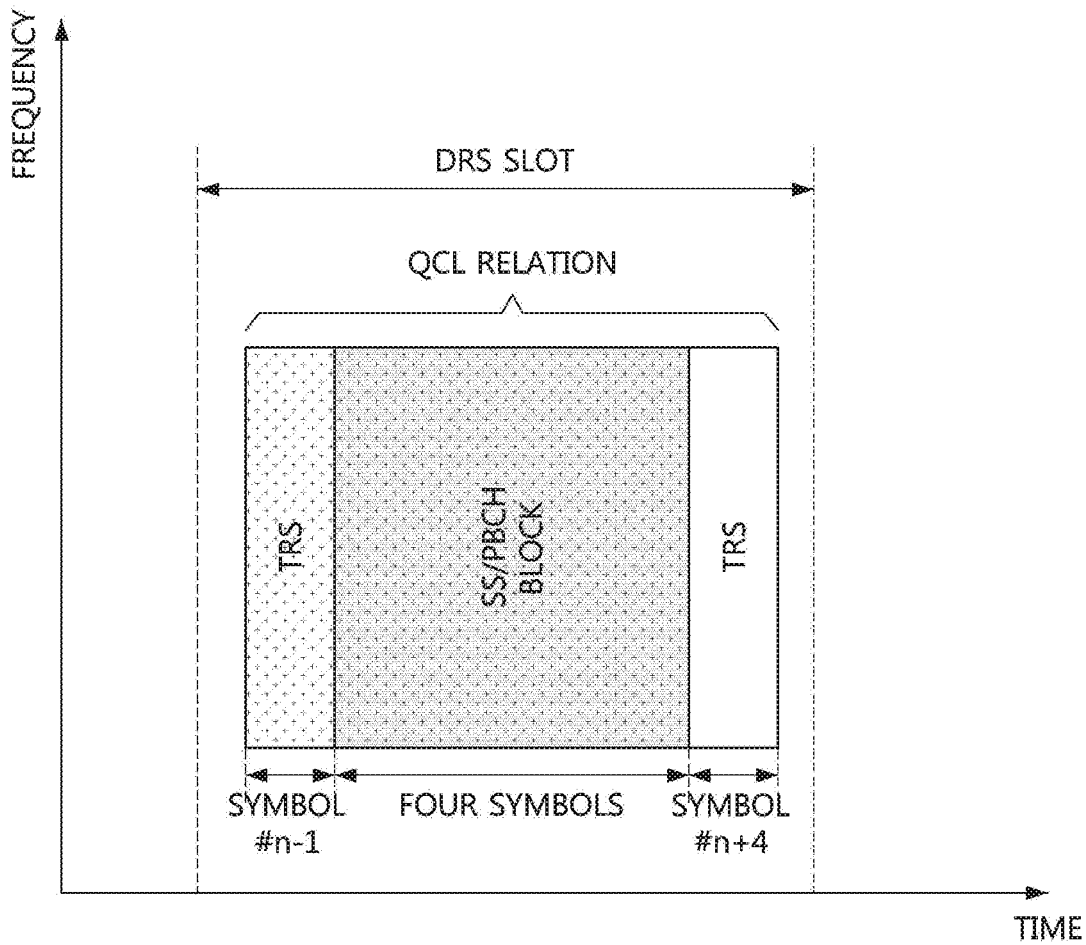
FIG. 7 is a conceptual diagram illustrating a second exemplary embodiment of a method of arranging a TRS in a communication system.

FIG. 7 is a conceptual diagram illustrating a second exemplary embodiment of a method of arranging a TRS in a communication system.

Referring to FIG. 7, the TRS may be located in the symbol #n−1 and the symbol #n+4, and the SS/PBCH block may be located in the symbol #n to symbol #n+3 located between the TRS symbols. When the previous symbol of the starting symbol of the SS/PBCH block and the subsequent symbol of the ending symbol of the SS/PBCH block are allocated as the TRS resources (e.g., TRS symbols), the base station may inform the terminal of the SS/PBCH block associated with the corresponding TRS instead of the location information of the TRS resource. When the TRS is associated with the SS/PBCH block, the terminal managing DL using the TRS may obtain time synchronization, frequency synchronization, and preprocessing assumption for demodulation of the TRS from the SS/PBCH block associated with the TRS.

Method of Triggering CSI-RS Transmission and Reception

The TRS transmission and reception procedure may be triggered by the base station. The terminal may receive dynamic signaling information (e.g., DCI) from the base station for TRS reception. When the TRS transmission and reception procedure is performed without triggering or when the TRS resource is configured by the DMTC configuration, an antenna port of the TRS may be the same as an antenna port of the CSI-RS that is triggered, and the TRS may have a QCL relation with the triggered CSI-RS. The terminal may perform a combining operation for the TRS regardless of the triggering of the TRS transmission and reception procedure.

The TRS transmission and reception procedure may be triggered by a specific combination between the CSI resource configuration and the CSI reporting configuration. The TRS resource may be configured based on the CSI-RS resource. In this case, the base station may inform the terminal of the characteristics of the TRS resource using higher layer signaling in the CSI resource configuration procedure. The terminal may receive the TRS from the base station, and may not report measurement information on the received TRS to the base station. Accordingly, the base station may inform the terminal that the measurement report operation on the reference signal (e.g., TRS) is not required by using higher layer signaling in the CSI resource configuration procedure.

The base station may transmit a UL grant including a field for triggering the TRS transmission and reception procedure to the terminal. The terminal may receive the UL grant from the base station, and may determine whether to transmit the TRS based on the field included in the UL grant. When it is determined that the TRS is transmitted from the base station, the terminal may receive the TRS by performing a monitoring operation on the TRS resource(s), and may estimate a DL based on the received TRS. The UL grant may further include resource allocation information of UL data. The terminal may transmit a PUSCH regardless of the TRS reception.

The aperiodic transmission and reception procedure of the CSI-RS may be performed without triggering. In this case, the terminal may receive the CSI-RS according to a field for triggering a CSI report, generate CSI based on the received CSI-RS, and report the CSI to the base station. Here, the CSI may be mapped to a PUSCH. The UL grant may further include resource allocation information of UL data. The terminal may transmit the PUSCH regardless of the CSI-RS reception.

In order to trigger the CSI-RS transmission and reception procedure or the TRS transmission and reception procedure, the base station may transmit a DCI (e.g., UL grant) for each terminal. Therefore, resources required for the PDCCH may increase in the unlicensed band.

In a proposed method, a common DCI for triggering the CSI-RS transmission and reception procedure may be defined. The base station may inform the terminals of a common RNTI by using higher layer signaling, and transmit a DCI including information for triggering the CSI-RS transmission and reception procedure. The common DCI may follow a DCI format according to the 3GPP technical specification. Alternatively, a new DCI format for the common DCI may be introduced. When a new DCI format is introduced, a new RNTI may be introduced.

The common DCI may be configured by concatenating indexes. One index included in the common DCI may mean information of a CSI-RS resource (e.g., information of a TRS resource, information of a CSI-RS resource for measuring channel quality indicator (CQI), or a CSI-RS resource for RRM measurement). The terminal may perform a monitoring operation on one or more indexes included in the common DCI. The common DCI may be used to trigger the CSI-RS transmission and reception procedure for one or more terminals.

The base station may inform the terminal of the location of the index indicating the CSI-RS resource information in the common DCI using higher layer signaling. The base station may inform the terminal of information on a plurality of CSI-RS resources using the higher layer signaling. Each of the plurality of CSI-RS resources may be represented by an index. The base station may transmit a common DCI including the index indicating the CSI-RS resource to the terminal. That is, one CSI-RS resource may be indicated to the terminal by a combination of the higher layer signaling and the common DCI. The information on the CSI-RS resource may be an index of the CSI-RS resource, time resource information of the CSI-RS (e.g., an index of a CSI-RS symbol when the CSI-RS resource is used as a TRS resource), an orthogonal cover code (OCC) of the CSI-RS, antenna port(s) of the CSI-RS, and the like. The CSI-RS symbol may mean a symbol to which the CSI-RS is mapped.

Figure 8:
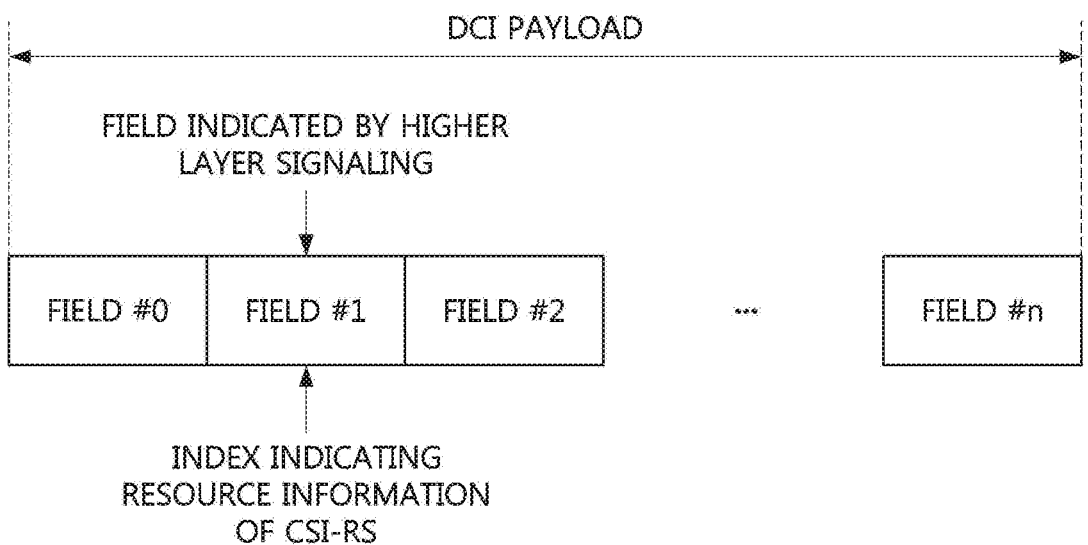
FIG. 8 is a conceptual diagram illustrating a first exemplary embodiment of a method of indicating resource information of a CSI-RS in a communication system.

FIG. 8 is a conceptual diagram illustrating a first exemplary embodiment of a method of indicating resource information of a CSI-RS in a communication system.

Referring to FIG. 8, a payload of the DCI may include a plurality of fields, and a specific field (e.g., field #1) among the plurality of fields may be an index indicating resource information of the CSI-RS. The base station may inform the terminal of location information of the field (e.g., field #1) indicating the resource information of the CSI-RS among the fields included in the DCI by using higher layer signaling. The terminal may identify the index indicating the resource information of the CSI-RS by performing a monitoring operation on the field (e.g., field #1) indicated by higher layer signaling among the fields included in the DCI.

In a proposed method, the DCI triggering the CSI-RS transmission and reception procedure may be a DCI scheduling DL transmission. In the following exemplary embodiments, the DCI scheduling DL transmission may be referred to as 'DL-DCI', and the DCI scheduling UL transmission may be referred to as 'UL-DCI'. When the CSI-RS resource is used as the TRS resource, the terminal may not report measurement information of the TRS to the base station. Thus, the CSI-RS transmission and reception procedure may not be triggered only by the UL grant.

In the communication system supporting an unlicensed band, when the base station transmits only the CSI-RS in a specific resource region, the CSI-RS transmission operation may violate the spectrum regulation. Therefore, the base station may not transmit only the CSI-RS in a specific resource region. To solve this problem, the base station may multiplex the CSI-RS with other channels (e.g., PDSCH) and/or signals. In order to reduce the size of the PDCCH, it may be preferable for one DCI to include resource allocation information of the PDSCH and resource information of the CSI-RS.

For a rate matching operation on the PDSCH, the terminal may consider a field indicating a zero power (ZP) CSI-RS resource among the fields included in the DCI. That is, the terminal may perform a rate matching operation on the PDSCH without considering a field indicating a non-ZP (NZP) CSI-RS resource included in the DCI.

Method of Configuring DRS Measurement Resource

The base station may inform the terminal of resource information of the DRS using higher layer signaling. The resource information of the DRS may include time resource information, frequency resource information, and sequence resource information. In a cell discovery procedure or an initial access procedure, the terminal may receive a PBCH and/or a PDSCH from the base station, and may identify time resource information of the SS/PBCH block based on broadcast information (e.g., RMSI or SIB1) obtained from the PBCH and/or the PDSCH.

The terminal may perform an RRM operation on a neighbor base station operating in the same carrier as the serving base station to which the terminal is associated, and may perform a handover operation based on a result of the RRM operation. In the communication system supporting a licensed band, the serving base station may use higher layer signaling to inform the terminal of physical layer identification information (e.g., physical cell id list, smtc2, pci-List) and measurement position information (periodicityAndOffset) of the neighbor base station. The terminal may identify a periodicity and an offset of the operation of the neighbor base station based on the measurement position information, and may perform demodulation and decoding operations on an SS/PBCH block of the neighbor base station based on the physical cell identification information. Here, the periodicity and offset may be configured in units of subframes.

In a proposed method, the resources of the SS/PBCH block and the CSI-RS may be configured in a configuration procedure of DRS measurement object. The CSI-RS resource may be used as an RRM-RS resource or a TRS resource. One SS/PBCH block may be associated with one or more CSI-RS resources. The DRS measurement object may include approximate time resource information (e.g., a periodicity and an offset in units of subframes or slots), a list consisting of SS/PBCH blocks, and a list consisting of one or more CSI-RS resources associated with the SS/PBCH block for the DRS measurement.

The subcarrier spacing of the PBCH belonging to the SS/PBCH block may be different from the subcarrier spacing of the CSI-RS resource(s) associated with the corresponding SS/PBCH block. In a proposed method, the DRS measurement object may further include information indicating the subcarrier spacing of the CSI-RS resource(s) associated with the SS/PBCH block.

In a proposed method, in order to indicate measurement of the SS/PBCH block, the DRS measurement object may further include frequency resource information of the SS/PBCH block. The terminal may identify the location of the starting PRB of the SS/PBCH block based on frequency resource information included in the DRS measurement object. In this case, the terminal does not need to find the frequency location of the SS/PBCH block even when performing a measurement operation (e.g., inter-frequency measurement operation) in another frequency region. Therefore, the power consumption of the terminal can be reduced.

In a proposed method, in order to configure the time resource(s) of the CSI-RS, a measurement periodicity for each of the CSI-RS resources associated with the SS/PBCH block may be configured. The measurement periodicity of the CSI-RS may be an integer multiple of the measurement periodicity of the SS/PBCH block. Here, the measurement periodicity may be configured in units of subframes or slots. The base station may inform the terminal of a value (e.g., ratio) of the measurement periodicity of the CSI-RS to the measurement periodicity of the SS/PBCH block. The CSI-RS may be multiplexed with the SS/PBCH block in one DRS slot. Alternatively, one DRS slot may include only the SS/PBCH block.

In a proposed method, indexes of resources (e.g., symbols) to which the CSI-RS is mapped may have a relative value according to the DRS slot. The DRS slot may be a candidate DRS slot in which the terminal first detects a DRS resource among the candidate DRS slots configured for the DRS measurement.

The CSI-RS resource may be used as an RRM-RS resource or a TRS resource. In a proposed method, a field indicating whether the CSI-RS resource is used as an RRM-RS resource or a TRS resource may be configured, and the field may be included in the DRS measurement object. The field set to a first value may indicate that the CSI-RS resource is an RRM-RS resource. In this case, the terminal may interpret the CSI-RS resource as an RRM-RS resource, and perform an RRM measurement operation based on a reference signal received in the corresponding RRM-RS resource. The field set to a second value may indicate that the CSI-RS resource is a TRS resource. In this case, the terminal may interpret the CSI-RS resource as a TRS resource, and perform DL management based on a reference signal received in the corresponding TRS resource.

The RRM-RS resource may be indicated by the DRS measurement object, and the TRS resource may not be indicated by the DRS measurement object. In this case, whether the CSI-RS resource is used as an RRM-RS resource or a TRS resource may not be indicated. In a proposed method, the DRS measurement object may include one or more lists, one list may indicate RRM-RS resource(s), and the remaining lists may indicate TRS resource(s). Alternatively, when the DRS measurement object includes only the list indicating the RRM-RS resource(s), the list indicating the TRS resource(s) may not be present in the DRS measurement object. The resource(s) indicated by one list may be interpreted as the RRM-RS resource(s). Alternatively, resource(s) not indicated by the list may be interpreted as the RRM-RS resource(s).

The CSI-RS resource may be used as an RRM-RS resource. In this case, the terminal should be able to know a bandwidth for the RRM measurement operation. In a proposed method, the list indicating the CSI-RS resource(s) may include information on the bandwidth for the RRM measurement operation. In a proposed method, a PRB set may be configured in the terminal, and the terminal may derive PRB(s) to which the CSI-RS resources are mapped. The PRB set may include all PRBs belonging to the bandwidth of the BWP. The base station may inform the terminal of the PRB set using higher layer signaling. In this case, the base station may omit an operation for configuring the bandwidth for the RRM measurement operation.

When the CSI-RS resource overlaps with the SS/PBCH block in a specific PRB, the CSI-RS resource overlapping with the SS/PBCH block may not be used for CSI-RS transmission. In a proposed method, the base station may inform the terminal of frequency resource information of the CSI-RS using higher layer signaling. When the CSI-RS is multiplexed with the SS/PBCH block in an FDM scheme (e.g., FIGS. 5A and 5B), the base station may inform the terminal of the starting PRB and/or the ending PRB of the CSI-RS using higher layer signaling.

When the SS/PBCH block is located at the edge of the BWP, and the CSI-RS is multiplexed with the SS/PBCH block in an FDM scheme, the CSI-RS may not overlap the SS/PBCH block in the frequency domain. The base station may inform the terminal of mapping information of the CSI-RS using higher layer signaling. When the CSI-RS is multiplexed with the SS/PBCH block in a TDM scheme, the base station may inform the terminal of the starting PRB and the ending PRB of the CSI-RS using higher layer signaling. In a proposed method, the frequency resource of the CSI-RS may be indicated by the frequency resource of the BWP. The CSI-RS may be mapped to a PRB(s) belonging to a reference BWP. The reference BWP may be firstActiveDownlinkBWP, defaultDownlinkBWP, initialDownlinkBWP, or a BWP last activated by the base station.

The base station may switch the BWP. In this case, the terminal may perform a BWP switching procedure using a preconfigured time (e.g., a radio frequency (RF) re-tuning delay time). After the BWP switching procedure is completed, the terminal may perform the measurement operation on the CSI-RS in the switched BWP. When a preconfigured time (e.g., inactivity timer) expires, the BWP may be switched to defaultDownlinkBWP. In this case, the terminal may perform the measurement operation on the CSI-RS in the switched BWP.

The base station may fix the reference BWP to one BWP so that a plurality of terminals may perform the measurement operation on the CSI-RS in common. For example, the terminal may be allowed to perform the measurement operation using the CSI-RS configured in initialDownlinkBWP. The base station may instruct the terminal to perform the measurement operation on the CSI-RS in the same BWP as the BWP of the CORESET and/or PDSCH for transmission of the RMSI. The terminal may assume that the BWP to which the CSI-RS is mapped as initialDownlinkBWP without additional signaling from the base station.

The terminal may perform the measurement operation on the CSI-RS and the decoding operation on the PDSCH. For example, the measurement operation on the CSI-RS may be performed simultaneously with the decoding operation on the PDSCH. In this case, the terminal may assume that the BWP to which the CSI-RS belongs is the same as the BWP to which the PDSCH belongs. In order to receive the CSI-RS and the PDSCH within a preconfigured time, the terminal may assume that the BWP to which the CSI-RS belongs is the same as the BWP to which the PDSCH belongs. Here, the BWP of the CSI-RS and PDSCH may be initialDownlinkBWP. When the CSI-RS is transmitted before or after the PDSCH, the base station may configure the BWP to which the PDSCH belongs to be the same as the BWP to which the CSI-RS belongs. The BWP to which the PDSCH belongs may be activated differently from the BWP to which the CSI-RS belongs. In this case, the terminal may receive the PDSCH at the most recently switched BWP. Here, the terminal may not receive the CSI-RS in the BWP to which the PDSCH belongs.

The base station may not inform the terminal of the BWP. In this case, the terminal may derive the PRB(s) to which the CSI-RS is mapped based on a CORESET for detecting a type 0 PDCCH common search space (CSS). The terminal may assume that the CSI-RS is mapped to all PRBs consecutive between the starting PRB and the ending PRB to which the CORESET is mapped.

First Exemplary Embodiment of DMTC

The DRS measurement object may be configured as shown in Table 1 below.

TABLE 1

DRS measurement configuration
Measurement periodicity (joint index of subframe/slot periodicity and offset)
A list of SS/PBCH block resources
    Physical cell ID
    Subcarrier spacing for CSI-RS
    A list of CSI-RS resources for mobility
        Type of CSI-RS resource
            either RRM-RS or TRS
        Relative timing from DRS slot boundary
        Multiplicity to SS/PBCH block periodicity The DRS measurement configuration information may include an indicator indicating the location of the DRS slot, a list indicating the SS/PBCH block resources, and the like. The location of the DRS slot may be expressed so that the terminal can receive the SS/PBCH block. The terminal may know the candidate subframe(s) and/or candidate slot(s) in which the DRS can be received based on the indicator indicating the location of the DRS slot.

The list indicating the SS/PBCH block resources may include time resource information of the SS/PBCH block, a list indicating CSI-RS resources, and a subcarrier spacing of the CSI-RS resources. Also, the list indicating the SS/PBCH block resources may further include frequency resource information of the SS/PBCH block.

The list indicating the CSI-RS resources may include time resource information of the CSI-RS. The time resource information of the CSI-RS may indicate the length from the slot where the SS/PBCH block (e.g., the last symbol of the SS/PBCH block) is received to the CSI-RS symbol. The list indicating the CSI-RS resources may further include a periodicity of the CSI-RS resource (e.g., measurement periodicity of the CSI-RS). The periodicity of the CSI-RS resource may be an integer multiple of the periodicity of the SS/PBCH block. The list indicating the CSI-RS resources may further include information indicating a purpose (e.g., RRM measurement or DL management) of the CSI-RS. The information indicating the purpose of the CSI-RS may be omitted from the list indicating the CSI-RS resources. In this case, the CSI-RS indicated by the list may be used only for the RRM measurement operation.

Second Exemplary Embodiment of DMTC

The DRS measurement object may be defined as shown in Table 2 below. A method of configuring CSI-RS resources according to Table 2 may be different from the method of configuring CSI-RS resources according to Table 1.

TABLE 2

DRS measurement configuration
Measurement periodicity (joint index of subframe/slot periodicity and offset)
A list of SS/PBCH block resources
    Physical cell ID
    Frequency resource
    Subcarrier spacing for CSI-RS
    A list of CSI-RS resources for RRM-RS
        Relative timing from DRS slot boundary
        Multiplicity to SS/PBCH block periodicity TABLE 2-continued A list of CSI-RS resources for TRS (as optional)
    Relative timing from DRS slot boundary
    Multiplicity to SS/PBCH block periodicity The DRS measurement object may include a list indicating CSI-RS resources, and the list indicating CSI-RS resources may include a subcarrier spacing of the CSI-RS resources. The DRS measurement object may include one or more lists. When the CSI-RS resources are indicated by one list or when CSI-RS resources are not indicated by the list, the terminal may perform the RRM measurement operation by using all the CSI-RS resources indicated by the list. There may be two lists indicating the CSI-RS resources. In this case, the terminal may perform the RRM measurement operation based on the CSI-RS resources belonging to the first list, and may perform the DL management operation based on the CSI-RS resources belonging to the second list.

Rate Matching Operation of PDSCH

Data may be transmitted in the DRS slot. The base station may transmit broadcast information (e.g., system information, paging information, etc.) and may transmit data (e.g., unicast data) for a specific terminal. The base station may transmit the DRS and the DCI in one DRS slot, and may transmit data based on a dynamic scheduling scheme. A CORESET may be configured in the DRS slot. The terminal may detect a DL control channel (e.g., PDCCH) by performing a monitoring operation on the CORESET, obtain a DCI from the DL channel, and obtain resource allocation information of a PDSCH from the DCI. Here, the DCI (e.g., CRC of the DCI) may be scrambled by an RNTI. When the DCI is transmitted to a specific terminal, the DCI (e.g., CRC of the DCI) may be scrambled by a C-RNTI, MCS-C-RNTI, or CS-RNTI. When the DCI is transmitted to unspecified terminals, the DCI (e.g., CRC of the DCI) may be scrambled by a P-RNTI, SI-RNTI, RA-RNTI, or temporary cell RNTI (TC-RNTI).

The terminal performing a cell discovery procedure or an initial access procedure may perform a decoding operation on a PDSCH-1_0 based on a DCI-1_0. The base station and the terminal may share a RE mapping rule of the PDSCH-1_0 in advance. When an SS/PBCH block is mapped to a resource region of the PDSCH-1_0 or when a specific CORESET is configured in the resource region of the PDSCH-1_0, the PDSCH-1_0 may not be mapped to the corresponding resource region (e.g., REs in which the SS/PBCH block or the CORESET is located). When the base station assigns a PDSCH-1_1, the terminal may know the location of the CSI-RS resource (e.g., NZP CSI-RS resource and ZP CSI-RS resource) in units of REs or symbols. In this case, the PDSCH-1_1 may be rate matched to REs or symbols excluding the CSI-RS resource in the resource region.

In the NZP CSI-RS resource, the base station may transmit the CSI-RS to the terminal using a specific power. That is, the NZP CSI-RS resource may be used for CSI-RS transmission. The CSI-RS may not be actually transmitted in the ZP CSI-RS resource. The base station may not map the PDSCH to the ZP CSI-RS resource. The ZP CSI-RS resource may be used for the terminal to distinguish between the REs or symbols to which the PDSCH is mapped and the REs or symbols to which the PDSCH is not mapped. The ZP CSI-RS resource may be used for other purposes than PDSCH transmission. For example, the ZP CSI-RS resource may be used as an RRM-RS resource or a TRS resource.

Since the DCI-1_0 includes resource allocation information of broadcast information for a terminal performing an access procedure or unspecified terminals, the terminal cannot dynamically identify the location of the CSI-RS resource based on the DCI-1_0 received from the base station. That is, the base station cannot indicate the CSI-RS resource allocated to a specific terminal using the DCI-1_0.

In the following exemplary embodiments, methods for adjusting a coding rate of the PDSCH (e.g., PDSCH-1_0) assigned by the DCI-1_0 will be described. The terminal may operate in an RRC connected state, an RRC inactive state, or an RRC idle state. The DCI-1_0 may include resource allocation information of the PDSCH-1_0, and the DCI-1_1 may include resource allocation information of the PDSCH-1_1. In the RE mapping procedure of the PDSCH-1_0, the terminal may regard the REs or symbols to which the PDSCH-1_0 is not mapped as the ZP resource. In the RE mapping procedure of PDSCH-1_1, the terminal may regard the REs or symbols to which the PDSCH-1_1 is not mapped as the ZP resource. The terminal may determine that the PDSCH (e.g., PDSCH-1_0 and PDSCH-1_1) is not mapped to the ZP resource, and may perform demodulation and decoding operations on data.

In a proposed method, the PDSCH may not be mapped to the ZP resources (e.g., REs or symbols) as well as the REs to which the SS/PBCH block is mapped. The terminal may determine that the PDSCH-1_0 and the PDSCH-1_1 are not mapped to the ZP resources (e.g., REs or symbols). The terminal may select only the REs or symbols to which the PDSCH-1_0 is mapped.

The terminal not operating in the RRC connected state may identify the location of the ZP resource based on a master information block (MIB), information derived from the MIB, an SSS, and a PSS. The terminal may identify the ZP resource in units of REs or symbols. Here, the MIB may include information indicating the ZP resource in units of REs or symbols. Alternatively, the ZP resource may be derived in units of REs or symbols based on the synchronization signal (e.g., SSS, PSS) or information inferred by the synchronization signal and the index of the SS/PBCH block. The above-described information may be confirmed by an unspecified terminal that does not operate in the RRC connected state. The above operation may be applied to a case where the base station allocates cell specific ZP resources and maps the PDSCH-1_0 based on the ZP resources.

In a proposed method, the PDSCH may not be mapped not only to the symbols where the SS/PBCH block is located but also to the symbol where the CSI-RS is located. Therefore, the code rate adjustment operation for the PDSCH-1_0 may be performed differently from the code rate adjustment operation for the PDSCH-1_1. Since the terminal may know the ZP resource associated with the PDSCH-1_1 in units of REs or symbols, the terminal may perform a decoding operation on the REs to which the PDSCH-1_1 is mapped. Since the terminal may know the ZP resources associated with the PDSCH-1_0 in units of REs or symbols, the terminal may perform a decoding operation on the symbols to which the PDSCH-1_0 is mapped. In order to inform the terminals not operating in the RRC connected state of the ZP resources in units of REs or symbols, a method for allocating cell-specific ZP resources may be applied.

PDSCH Puncturing Method

The terminal may not receive information on the ZP resource from the base station. In this case, the terminal may perform a puncturing operation to receive a PDSCH. The base station may map the PDSCH to resources (e.g., REs or symbols) allocated by the DCI without considering the REs to which the CSI-RS is mapped. In addition, the base station may map the CSI-RS to preconfigured resources (e.g., REs or symbols) without considering the REs to which the PDSCH is mapped. In order to implement the above-described method, the base station may first map the PDSCH to a resource grid, and then perform a CSI-RS mapping operation. When the PDSCH is mapped to the REs or symbols to which the CSI-RS is to be mapped, the base station may map the CSI-RS to the corresponding REs or symbols instead of the PDSCH.

The terminal that is to receive the CSI-RS may know the REs or symbols to which the CSI-RS is mapped based on a preconfigured location of the CSI-RS, regardless of the RE mapping of the PDSCH. The terminal that is to receive the PDSCH may not know the CSI-RS resource. In this case, the CSI-RS mapped to the PDSCH REs (e.g., REs or symbols belonging to a resource region of the PDSCH) may be forwarded to a decoder for the PDSCH in the terminal. That is, the terminal may regard the CSI-RS mapped to the PDSCH REs as the PDSCH. This terminal operation may be predicted at the base station. Therefore, the base station may adjust a modulation and coding scheme (MCS) level of the PDSCH so that a target error rate can be achieved at the terminal.

The terminal may know resource information of the CSI-RS and may perform a decoding operation on the PDSCH based on the resource information of the CSI-RS. In this case, the PDSCH may not be mapped to the REs or symbols occupied by the CSI-RS. In the PDSCH decoding procedure, an input value of the CSI-RS mapped to the PDSCH REs (e.g., input value to the decoder for the PDSCH) may be adjusted. For example, in the PDSCH decoding procedure, a probability value (e.g., detection probability for a coded bit, a log likelihood ratio (LLR), or a soft bit) for the CSI-RS mapped to the PDSCH REs may not be derived. In this case, a probability that the CSI-RS mapped to the PDSCH REs is 1 may be regarded as the same as a probability that the CSI-RS mapped to the PDSCH REs is 0.

Method of Configuring Cell/BWP-Specific ZP Resource

In a proposed method, information on the ZP resource (e.g., ZP CSI-RS resource) may be represented by information on a cell or a sector. The ZP CSI-RS resource may refer to REs to which the PDSCH-1_0 or the PDSCH-1_1 is not mapped. The terminals (e.g., unspecified terminals) that do not operate in the RRC connected state may identify the location of the ZP resource from a function of a cell or a BWP. For example, the terminal may identify the location of the ZP resource based on information derived from physical cell identification information. The ZP resource may include a time resource and a frequency resource and may be expressed in units of REs. Alternatively, the ZP resource may be expressed in units of symbols.

In a proposed method, the terminal may identify the location of the ZP resource using an index of SS/PBCH block, physical cell identification information, or information inferred by the physical cell identification information and the index of SS/PBCH block. Here, the ZP resource may be expressed in units of REs or symbols. The terminal may obtain the physical cell identification information for the SS/PBCH block through demodulation/decoding operations on the SS/PBCH block or higher layer signaling of the base station. In this case, the terminal may identify the location of the ZP resource regardless of the RRC operation state. That is, the unspecified terminal may also know the location of the ZP resource. The base station may not explicitly indicate the location of the REs or symbols to which the PDSCH-1_0 is mapped. Even in this case, the unspecified terminals may know the location of the REs or symbols to which the PDSCH-1_0 is mapped. The PDSCH-1_0 may be dynamically assigned by the DCI-1_0 scrambled by P-RNTI, RA-RNTI, TC-RNTI, SI-RNTI, C-RNTI, MCS-C-RNTI, or CS-RNTI.

When the ZP resource is used as an RRM-RS resource, the location of the time resource (e.g., ZP symbol) of the ZP may be derived based on the index of SS/PBCH block, physical cell identification information, or information inferred by the physical cell identification information and the index of the SS/PBCH block. When the ZP resource is used as an RRM-RS resource, the location of the frequency resource (e.g., subcarrier) of the ZP may be a remainder value obtained by dividing the value derived based on the index of SS/PBCH block, the physical cell identification information, or the information inferred by the physical cell identification information and the index of the SS/PBCH block by a preconfigured value (e.g., 4). The terminal not operating in the RRC connected state may identify the RRM-RS resource in units of REs or symbols by combining the above-described information.

When the ZP resource is used as an RRM-RS resource, the terminal may assume that a frequency band occupied by the RRM-RS resource is located over the entire carrier. Alternatively, the terminal may assume that the frequency band occupied by the RRM-RS resource is valid in an LBT subband. The terminal may detect the REs to which the PDSCH-1_0 is mapped under the above-described assumption. The LBT subband may include one or more resource blocks (RBs).

When the ZP resource is used as a TRS resource, the location of the time resource (e.g., symbol) of the ZP may be derived based on the index of SS/PBCH block, physical cell identification information, or information inferred by the physical cell identification information and the index of SS/PBCH block. When the ZP resource is used as a TRS resource, the location of the frequency resource (e.g., subcarrier) of the ZP may be a remainder value obtained by dividing the value derived based on the physical cell identification information or the information inferred by the physical cell identification information and the index of the SS/PBCH block by a preconfigured value (e.g., 4). The terminal not operating in the RRC connected state may identify the TRS resource in units of REs or symbols by combining the above-described information.

When the ZP resource is used as a TRS resource, the terminal may assume that the frequency band occupied by the TRS resource is located over the entire carrier. The terminal may detect the REs to which the PDSCH-1_0 is mapped based on the above-described assumption.

DL SPS Configuration and HARQ Response

DL semi persistent scheduling (SPS) information may be indicated to the terminal by higher layer signaling as well as physical layer signaling. The information indicated to the terminal through higher layer signaling (e.g., RRC message) may be distinguished from the information indicated to the terminal through physical layer signaling (e.g., DCI). In the following exemplary embodiments, an SPS PDSCH may be a PDSCH scheduled by the DL SPS information.

The RRC message may include a reception periodicity (e.g., transmission periodicity) of the SPS PDSCH, the number (e.g., maximum number) of HARQ processes that the SPS PDSCH has, a resource index of a PUCCH used for transmission of an HARQ response for the SPS PDSCH, an MCS table for the SPS PDSCH, and the like. The reception periodicity of the SPS PDSCH may be 10 ms to 640 ms. The number (e.g., maximum number) of HARQ processes that the SPS PDSCH has may be eight. The MCS table may be an MCS table defined up to 64 quadrature amplitude modulation (QAM) or an MCS table defined up to 256QAM. In addition, the base station may inform the terminal of the CS-RNTI. The CS-RNTI may be used for scrambling of PHY messages (e.g., DL-DCI).

The DL-DCI format 1_0 may include frequency-domain PRB allocation information, time resource information of the PDSCH, virtual resource block (VRB) to physical resource block (PRB) mapping information, an MCS, a new data indicator (NDI), a redundancy version (RV), an HARQ process index, a downlink assignment index (DAI), a transmission power control (TPC) for the PUCCH, a PRI (e.g., resource index of UL control channel), a slot offset for feedback of the HARQ response, and the like.

The DL-DCI format 1_1 may include one or more information included in the DL-DCI format 1_0. In addition, the DL-DCI format 1_1 may further include a BWP index, a carrier index, an indicator of PRB bundling size, a rate matching indicator, a ZP CSI-RS trigger, and the like. A transmission slot of the SPS PDSCH may occur periodically based on a slot in which the DL-DCI for initializing or reconfiguring the SPS PDSCH is received.

When the DL-DCI is scrambled by the CS-RNTI and the NDI is 1, the terminal may determine that a retransmission operation for the HARQ process indicated by the corresponding DL-DCI is performed. When the DL-DCI is scrambled by the CS-RNTI and the NDI is 0, the terminal may determine that an initial transmission operation or a reconfiguration operation for the HARQ process indicated by the corresponding DL-DCI is performed.

An MCS-CS-RNTI may be introduced for SPS for a URLLC PDSCH. The URLLC PDSCH may be a PDSCH that satisfies the requirements of the URLLC service.

Method of Configuring a Frequency Position of a Resource Grid

A UL grant for scheduling a PUSCH may be transmitted to the terminal through a PDCCH or an RRC message. The UL grant may include a bitmap for indicating frequency resources of the PUSCH. The terminal may identify an index of an LBT subband based on the bitmap included in the UL grant. The terminal may perform an LBT operation in the LBT subband indicated by the base station. When the LBT operation is successful, the terminal may transmit the PUSCH in the corresponding LBT subband. An index(es) of a PUSCH interlace may be indicated by the bitmap. The PUSCH interlace may indicate PUSCH resources in the frequency domain. For example, one PUSCH interlace may include one or more physical resource blocks (PRBs).

There may be one point A in an unlicensed band. When the unlicensed band includes a plurality of LBT subbands, a common resource block (CRB) applied to the LBT subband positioned in the middle of the unlicensed band may have a large offsetToPointA. When an LBT operation succeeds in adjacent LBT subbands, the terminal may map the PUSCH to PRBs located at the boundary of the adjacent LBT subbands.

Frequency resources of the PUSCH may be allocated by the UL grant, and the frequency resources of the PUSCH allocated by the UL grant may be located in the LBT subbands #1 and #2. In this case, the terminal may use the LBT subband #1 and/or the LBT subband #2 according to a result of the LBT operation. The terminal may perform a PUSCH mapping operation according to a PUSCH interlace of each of the LBT subbands #1 and #2. The PUSCH interlace may be indicated by a bitmap included in the UL grant.

For example, there may be four LBT subbands, and points Ai and Bi may be defined for each of the four LBT subbands. Here, i may be 1, 2, 3, or 4. The carrier for the activated wideband BWP may be indicated by the point A (e.g., point A1) and the point B (e.g., point B4). The PUSCH may be mapped to the PUSCH interlace based on the point A for each LBT subband.

In each of the LBT subbands, a resource grid may be defined based on the point A. In one LBT subband, a carrier (e.g., BWP) of a first terminal may be configured. In a plurality of LBT subbands, a carrier (e.g., BWP) of a second terminal may be configured. In this case, the BWP (e.g., one LBT subband) of the first terminal may be multiplexed with the BWP (e.g., the plurality of LBT subbands) of the second terminal in the frequency domain.

The starting point of the PUSCH interlace in one LBT subband (e.g., activated BWP) may be derived from the point A of the corresponding LBT subband. The PUSCH interlaces may belong to different BWPs. Even in this case, in order for the base station to multiplex the terminals in the frequency domain, the corresponding PUSCH interlaces may have the same starting point. That is, the PUSCH interlaces may be started from the same subcarrier. To this end, the base station may configure the BWP (e.g., carrier) such that the PUSCH interlaces have the same starting point (e.g., PRB), and activate the corresponding BWP.

The base station may not multiplex the terminals in the frequency domain. In this case, the resource grids in the BWPs may not match. When the time multiplexing scheme is used, the base station may use a channel occupancy time (COT) secured by the LBT operation. In addition, the size of the maximum COT (MCOT) may be limited by the spectrum regulation.

Method of Transmitting a COT Indicator

The base station may transmit a DL signal and/or a DL channel by performing an LBT operation. The terminal may transmit a UL signal and/or a UL channel by performing an LBT operation. The LBT operation may be performed according to a defer time according to an LBT category. When a category 2 LBT (hereinafter referred to as 'C2 LBT') is used, each of the base station and the terminal may perform the LBT operation for a fixed time T (e.g., 16 μs or 25 μs) in the LBT subband. When the result (e.g., strength of a received signal or energy detection level) of the LBT operation is less than or equal to a threshold value, each of the base station and the terminal may determine that a signal and/or a channel can be transmitted in the corresponding LBT subband.

When a category 4 LBT (hereinafter referred to as 'C4 LBT') is used, each of the base station and the terminal may determine a defer time based on a channel access priority class (CAPC) p and a random variable selected within a contention window, and may perform the LBT operation for the defer time. The random variable may be a randomly selected value within a range (e.g., 0, ..., L−1) smaller than the size L of the contention window. When the result (e.g., received signal strength) of the LBT operation is less than or equal to a threshold value, each of the base station and the terminal may determine that a signal and/or a channel can be transmitted in the corresponding LBT subband. When the result (e.g., received signal strength) of the LBT operation exceeds the threshold value, each of the base station and the terminal may stop the random backoff procedure. When it is determined that the LBT subband is in the idle state, each of the base station and the terminal may resume the stopped random backoff procedure.

A COT indicator may be included in a group common DCI. The group common DCI including the COT indicator may be transmitted in a common search space (CSS) of a CORESET. There may be one or more PDCCH candidates in the CSS. A scrambling sequence of the group common DCI including the COT indicator may be commonly applied to unspecified terminals. The base station may configure an RNTI used for scrambling of the group common DCI including the COT indicator to a plurality of terminals using higher layer signaling. The terminal may perform a descrambling operation on the group common DCI including the COT indicator by using the RNTI configured by the base station.

Frequency Resource to which the COT Indicator is Applied

The COT indicator may be transmitted for each CORESET. For example, the terminal may perform a monitoring operation on the CORESET in a DL BWP configured in a plurality of LBT subbands. When the CORESET is defined for each LBT subband, the terminal may detect the COT indicator by performing a monitoring operation on the plurality of CORESETs. In a proposed method, one COT indicator may indicate a frequency resource structure for one or more LBT subbands or one or more carriers. When a plurality of COT indicators are received, the terminal may expect that each of the plurality of COT indicators indicates coincident information for the same LBT subband or the same carrier.

The terminal may not perform a descrambling operation on the DCI including the COT indicator. In this case, the terminal may determine that the LBT operation performed by the base station is successful based on a CORESET demodulation reference signal (DM-RS). Alternatively, the terminal may determine that the LBT operation performed by the base station is not successful. The CORESET DM-RS may be a DM-RS located in the CORESET. The terminal may determine whether to perform a monitoring operation on a CORESET configured in another LBT subband based on the COT indicator.

The base station may perform the LBT operation for each LBT subband. When the LBT operation is successful, the base station may transmit a DL signal and/or a DL channel in the corresponding LBT subband. The base station may determine a frequency resource structure of one or more LBT subbands occupied by resources allocated by the base station after performing the LBT operation. Sufficient time may be needed at the base station for the transmission operation of the COT indicator (e.g., generation of the COT indicator, mapping of the COT indicator to a PDCCH, and transmission of the PDCCH). When sufficient time is not secured for the transmission operation of the COT indicator, the base station may not transmit the COT indicator.

In a proposed method, one COT indicator may indicate a frequency resource structure for one or more LBT subbands or one or more carriers. When a plurality of COT indicators are received, the terminal may determine that each of the plurality of COT indicators indicates different information for the same LBT subband or the same carrier. The terminal may determine that the LBT operation is successful at the base station by performing a descrambling operation on the DCI (e.g., CRC of the DCI) including the COT indicator.

The COT indicator may include information indicating the LBT subband or carrier for which the LBT operation is successful. When a sufficient time is not secured for the transmission operation of the COT indicator, the base station may transmit a different COT indicator for each LBT subband. The base station may transmit the DCI including the COT indicator through the CORESET configured for each LBT subband. The DCI (e.g., COT indicator) transmitted in a specific LBT subband may not include information for other LBT subbands.

When a sufficient time is secured for the transmission operation of the COT indicator, the COT indicator including information of a time resource structure (e.g., slot pattern) commonly applied to the LBT subbands and information (e.g., pattern) of the LBT subband(s) for which the LBT operation is successful may be transmitted in all LBT subbands. When a sufficient time is not secured for the transmission operation of the COT indicator, the information of the frequency resource structure of the COT may be defined as a separate value. The COT indicator of each of the LBT subbands may include information on the corresponding LBT subband.

Method of Indicating the Same Slot Structure Using a Plurality of COT Indicators The CORESET in which the COT indicator is transmitted may be located in the first portion (e.g., symbol) of the slot. The CORESET may not be located after the third symbol of the slot. Alternatively, the CORESET may be located after the third symbol of the slot if the slot is the first slot that the terminal or the base station acquires after the appropriate LBT procedure. The number of consecutive symbols to which the CORESET is mapped may not be greater than three. In addition, the CORESET may be located after the second symbol or in the second symbol of the slot.

The COT indicator may indicate the location of the DL resource in one or more slots. The location of the DL resource indicated by the COT indicator may be valid in one or more LBT subbands. The valid LBT subband(s) may be determined based on the information of the frequency resource structure included in the COT indicator. The COT indicator may include information indicating one or more valid slots. A plurality of COT indicators may indicate a time resource structure and a frequency resource structure of one slot.

Figure 9:
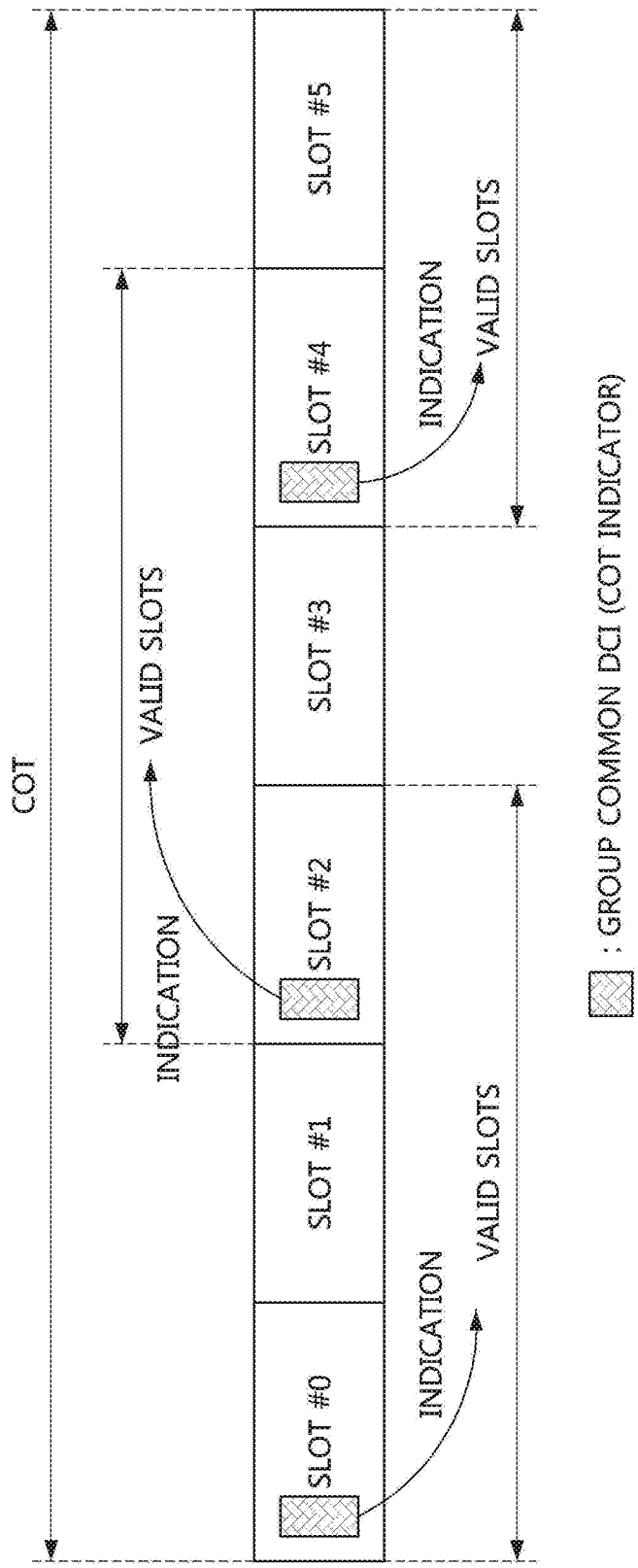
FIG. 9 is a conceptual diagram illustrating a first exemplary embodiment of a mapping method of a COT indicator in a communication system.

FIG. 9 is a conceptual diagram illustrating a first exemplary embodiment of a mapping method of a COT indicator in a communication system.

Referring to FIG. 9, the base station may acquire a COT including six slots (e.g., slots #0 to #5) by performing an LBT operation. A DCI (e.g., group common DCI) including a COT indicator may be transmitted for every two slots. For example, the DCI including the COT indicator may be transmitted in the slot #0, the slot #2, and the slot #4. The DCI including the COT indicator may be transmitted in a front region of the slot. The DCI including the COT indicator may not be transmitted in the first symbol of the slot. The COT indicator may include information (e.g., structure information) on a plurality of slots. The slot information may be indicated by a plurality of COT indicators.

Information on the slot #2 may be indicated by the COT indicator received in the slot #0 and the COT indicator received in the slot #2. Information on the slot #4 may be indicated by the COT indicator received in the slot #2 and the COT indicator received in the slot #4. When information of a specific slot is indicated by different COT indicators, slot information indicated by the different COT indicators may be the same or different. In a proposed method, when information of a specific slot is indicated by different COT indicators, the terminal may regard the slot information indicated by different COT indicators as the same.

In a proposed method, when information of a specific slot is indicated by different COT indicators, the terminal may identify the information of the specific slot according to the last received COT indicator among the different COT indicators. The COT indicator received in the slot #0 may indicate a structure valid in the slots #0 to #2. The COT indicator received in the slot #2 may indicate a structure valid in the slots #2 to #4. The COT indicator received in the slot #4 may indicate a structure valid in the slots #4 and #5. In this case, the terminal may identify the structure of the slot #2 based on the COT indicator received in the slot #2, and may identify the structure of the slot #4 based on the COT indicator received in the slot #4.

In a proposed method, when information of a specific slot is indicated by a plurality of COT indicators, the information of the specific slot included in the plurality of COT indicators may be the same. Some of the terminals may perform a discontinuous reception (DRX) operation to save power. In this case, when the information of the specific slot is indicated by a plurality of COT indicators, the terminal may use slot information that is not updated. To solve this problem, the base station may transmit the same information for one slot.

Even when the structure of the plurality of slots is indicated by a combination of indexes, the structure of one slot may have the same pattern. When structure information of all slots is acquired within a time (e.g., COT) configured by the base station, the terminal may not perform a decoding operation on the COT indicator. The slot structure indicated by the COT indicator may not be changed. The terminal may not perform the decoding operation on the COT indicator several times.

Meanwhile, some or all of the slot structure indicated by the COT indicator may be overridden. In a proposed method, a plurality of COT indicators may indicate the same information for a portion of the structure of the same slot, and the information of the remaining portion of the structure of the same slot may be overridden. In one LBT subband, there may be resources that cannot be overridden (e.g., DL resources) and resources that can be overridden (e.g., flexible (FL) resources). The first COT indicator may indicate the resource(s) that can be overridden, and the resource(s) indicated by the first COT indicator may be overridden. In this case, the second COT indicator after the first COT indicator may override the resource(s) configured by the first COT indicator.

In a proposed method, when information (e.g., structure information) of a specific slot is indicated by a plurality of COT indicators, information of the specific slot included in the plurality of COT indicators may be different. In this case, the terminal may identify the slot structure (e.g., the structure of the time and frequency resources of the slot) based on the last received COT indicator among the plurality of COT indicators. The structure information of the slot indicated by the COT indicator first received in the time domain among the plurality of COT indicators may be overridden. The base station may change the information indicated by the COT indicator to dynamically respond to the state of traffic. In this case, it may be preferable for the terminal to receive all COT indicators.

Method of not Transmitting a DCI Including a COT Indicator in the First Slot

When sufficient time is not secured for the transmission operation of the COT indicator, the base station may not transmit a DCI (e.g., group common DCI) including the COT indicator in the first slot in the COT.

Figure 10:
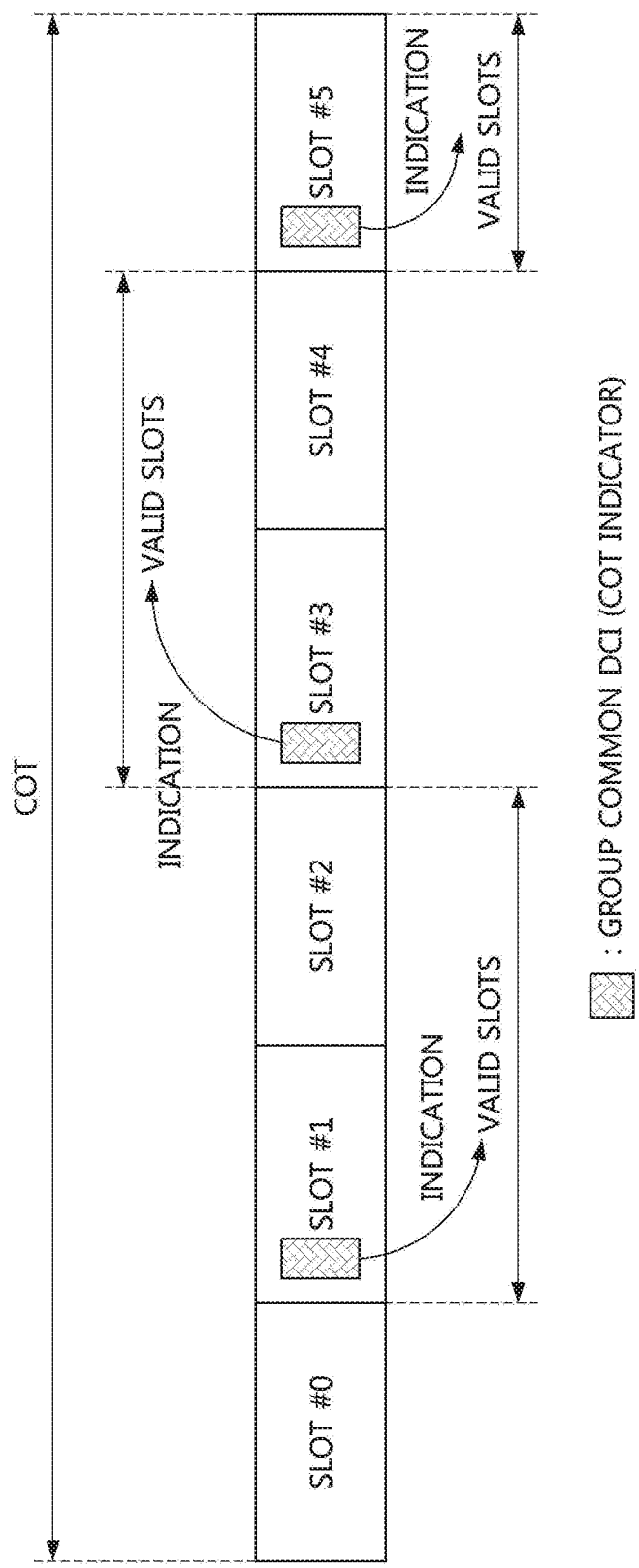
FIG. 10 is a conceptual diagram illustrating a second exemplary embodiment of a mapping method of a COT indicator in a communication system.

FIG. 10 is a conceptual diagram illustrating a second exemplary embodiment of a mapping method of a COT indicator in a communication system.

Referring to FIG. 10, the base station may acquire a COT including six slots (e.g., slots #0 to #5) by performing an LBT operation. The base station may not transmit a DCI including a COT indicator in the first slot (e.g., slot #0) in the COT. The DCI including the COT indicator may be transmitted in the slot #1, the slot #3, and the slot #5. That is, the terminal may receive the DCI in each of the slot #1, the slot #3, and the slot #5, and may identify the COT indicator included in the DCI.

Structure information of the slot #0 may not be transmitted. The COT indicator may include structure information of two slots. The COT indicator received in the slot #n may include structure information of the slots #n and #n+1. n may be an integer equal to or greater than 0. A periodicity of a CORESET and a search space configured in the terminal may be two slots. The COT indicator received in the slot #5, the last slot of the COT, may include structure information of one slot (e.g., slot #5).

The terminal may determine an application time of a pattern of a slot and a pattern of LBT subband(s) (e.g., pattern of carrier(s)) indicated by the COT indicator. The terminal may apply the information indicated by the COT indicator from the slot in which the COT indicator is received. The base station may transmit a different COT indicator for each LBT subband or carrier. In this case, different slot patterns for the same LBT subband or the same carrier may be indicated to the terminal. Therefore, the terminal may not be able to interpret a pattern of a specific slot(s) indicated by the COT indicator.

In a proposed method, the base station may explicitly inform the terminal of the application time of the COT indicator (e.g., a starting slot to which the COT indicator is applied). The base station may inform the terminal of information indicating the application time of the COT indicator using higher layer signaling. When the application time indicated by higher layer signaling is set to a first value, the terminal may apply a slot pattern indicated by the corresponding COT indicator from the slot in which the COT indicator is received. When the application time indicated by higher layer signaling is set to a second value, the terminal may apply the slot pattern indicated by the corresponding COT indicator to a slot after k slot(s) from the slot in which the COT indicator is received. k may be configured to the terminal through higher layer signaling.

The base station may not configure the application time of the COT indicator and/or k. The base station may transmit an index indicating a pattern of a plurality of slots to the terminal. When a specific field in the COT indicator has a first value, the index configured to the terminal may be applied from the slot in which the COT indicator is received. When the specific field in the COT indicator has a second value, the index configured to the terminal may be applied from a slot after k slot(s) from the slot in which the COT indicator is received. k may be configured to the terminal through higher layer signaling. Alternatively, k may be defined in the 3GPP technical specification. For example, k may be an integer equal to or greater than 1.

Figure 11:
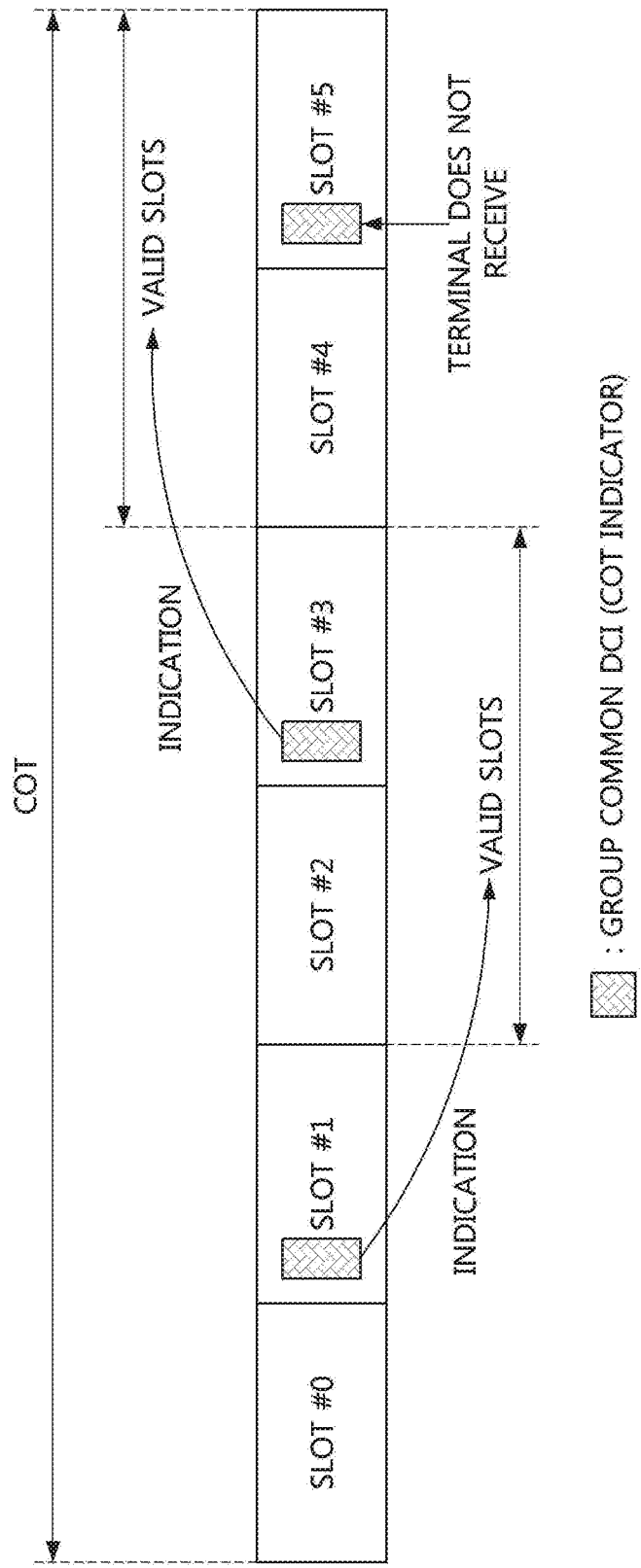
FIG. 11 is a conceptual diagram illustrating a third exemplary embodiment of a mapping method of a COT indicator in a communication system.

FIG. 11 is a conceptual diagram illustrating a third exemplary embodiment of a mapping method of a COT indicator in a communication system.

Referring to FIG. 11, the base station may acquire a COT including six slots (e.g., slots #0 to #5) by performing an LBT operation. The base station may not be able to transmit a DCI including a COT indicator in the first slot (e.g., slot #0) in the COT. The base station may transmit the DCI including the COT indicator in the slot #1, the slot #3, and the slot #5. That is, the DCI including the COT indicator may be transmitted for every two slots.

The COT indicator may include structure information of two slots. The COT indicator included in the DCI transmitted in the slot #1 may include structure information of the slots #2 and #3. The COT indicator included in the DCI transmitted in the slot #3 may include structure information of the slots #4 and #5. The COT indicator included in the DCI transmitted in the slot #5 may include structure information of the slots #6 and #7. Since the slots #6 and #7 are not included in the COT, the terminal may not receive the DCI in the slot #5. The terminal may receive the DCI by performing a monitoring operation in a CORESET (e.g., search space) of each of the slots #1 and #3 and may obtain the COT indicator included in the DCI.

In a proposed method, the base station may explicitly inform the terminal of an application time of the COT indicator (e.g., a starting slot to which the COT indicator is applied). The base station may inform the terminal of an index that collectively indicates patterns of a plurality of slots. When a specific field in the COT indicator has a first value, the index configured to the terminal may be applied from the slot in which the COT indicator is received. When the specific field in the COT indicator has a second value, the index configured to the terminal may be applied from a slot before k slot(s) from the slot in which the COT indicator is received. k may be configured to the terminal through higher layer signaling. Alternatively, k may be defined in the 3GPP technical specification. For example, k may be an integer equal to or greater than 1.

Figure 12:
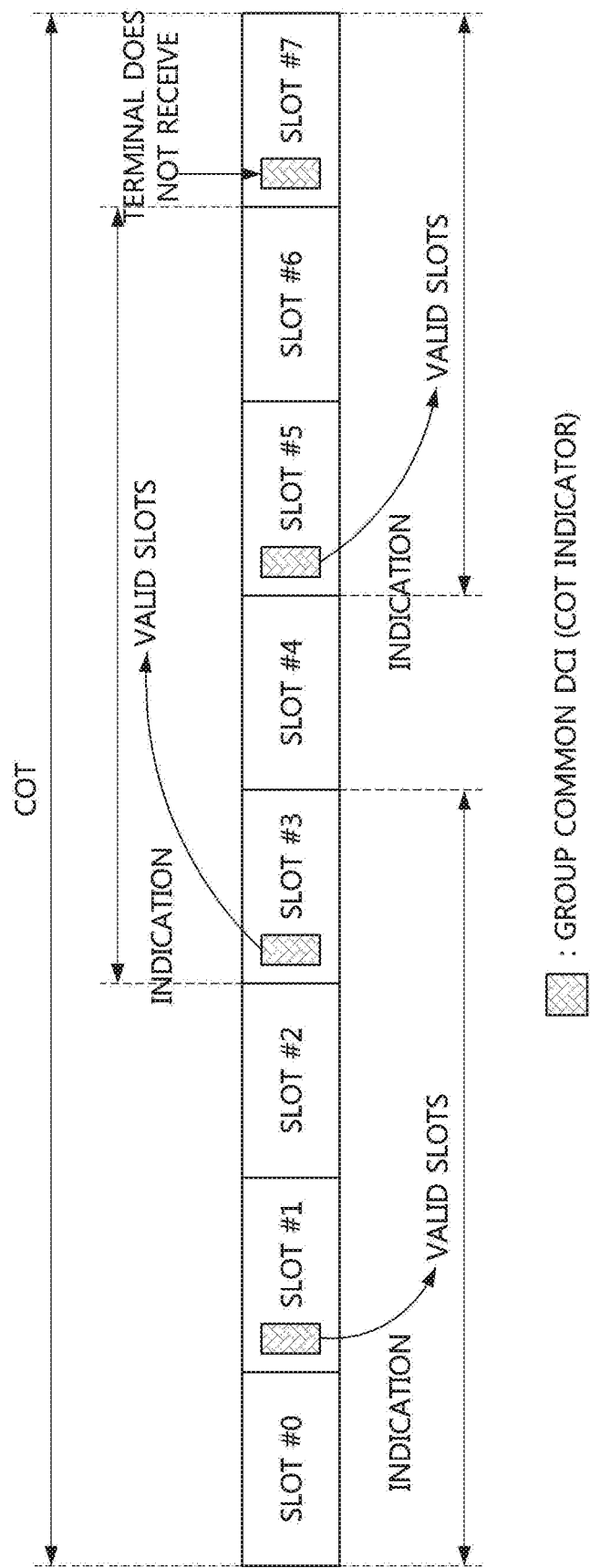
FIG. 12 is a conceptual diagram illustrating a fourth exemplary embodiment of a mapping method of a COT indicator in a communication system.

FIG. 12 is a conceptual diagram illustrating a fourth exemplary embodiment of a mapping method of a COT indicator in a communication system.

Referring to FIG. 12, the base station may acquire a COT including eight slots (e.g., slots #0 to #7) by performing an LBT operation. When sufficient time is not secured for the transmission operation of the COT indicator, the base station may not transmit a DCI including a COT indicator in the first slot (e.g., slot #0) in the COT. Accordingly, the base station may transmit the DCI including the COT indicator in the slot #1, the slot #3, the slot #5, and the slot #7. The DCI including the COT indicator may be transmitted for every two slots. A periodicity of a CORESET (e.g., search space) configured in the terminal may be two slots.

The COT indicator included in the DCI transmitted in the slot #1 may include structure information of the slots #0 to #3. A specific field included in the COT indicator may indicate that an application time of the COT indicator is a slot (e.g., slot #0) before the slot #1 in which the COT indicator is transmitted. The COT indicator included in the DCI transmitted in the slot #3 may include structure information of the slots #3 to #6. A specific field included in the COT indicator may indicate that the application time of the COT indicator is the slot #3 in which the COT indicator is transmitted.

The COT indicator included in the DCI transmitted in the slot #5 may include structure information of the slots #5 to #7. A specific field included in the COT indicator may indicate that the application time of the COT indicator is the slot #5 in which the COT indicator is transmitted. Since the COT indicator included in the DCI transmitted in the slot #7 includes structure information of a slot(s) after the COT, the terminal may not receive the DCI in the slot #7. The terminal may receive the DCI by performing a monitoring operation on a CORESET (e.g., search space) of each of the slot #1, the slot #3, and the slot #5, and may obtain the COT indicator included in the DCI.

Method of Changing the Number of Valid Slots Indicated by the COT Indicator

The base station may transmit information required for reception of the COT indicator to the terminal using higher layer signaling. The terminal may obtain the information required for reception of the COT indicator through higher layer signaling. The information required for reception of the COT indicator may include information indicating a periodicity of a CORESET and/or a search space. The terminal may receive a DCI including the COT indicator in a slot(s) (e.g., COT) secured by the base station. The COT may include information of a time resource structure (e.g., slot format) and information of a frequency resource structure (e.g., the number of LBT subbands) of the slot(s) secured by the base station.

The number of slots included in the COT secured by the base station may be less than or equal to a preconfigured maximum number. The maximum number of slots included in the COT may be determined according to the spectrum regulation and the access class (e.g., CAPC) of the LBT operation. The transmission periodicity of the COT indicator may be the same as the periodicity of the CORESET and/or the search space. The number of slots included in the COT secured by the base station may not be divided without a remainder by the number of slots corresponding to the transmission periodicity of the COT indicator.

In a proposed method, the COT indicator may include information indicating the number of valid slots to which the information indicated by the corresponding COT indicator is applied. A specific field included in the COT indicator may indicate the number of valid slots in form of an index. The COT indicator may indicate an ending point (e.g., slot index, number of slots, mini-slot index, number of mini-slots) of the COT.

The base station may inform the terminal that the index included in the COT indicator indicates a structure of N or more slots using higher layer signaling. N may be an integer equal to or greater than 1. The N slots indicated by the COT indicator may be included in the COT secured by the base station. Alternatively, one or more slots among the N slots indicated by the COT indicator may be located before or after the COT secured by the base station.

The COT indicator may be applied to N consecutive slots starting from a slot before k slot(s) from the slot in which the corresponding COT indicator is received. Alternatively, the COT indicator may be applied to N consecutive slots after k slot(s) from the slot in which the COT indicator is received. One or more of the slots to which the COT indicator is applied may not belong to the COT secured by the base station. When the index included in the COT indicator indicates structure information of the slot(s), the base station may inform the terminal of the number M of valid slots to which the COT indicator is applied. The number M of valid slots may be indicated in form of an index. Here, it may be defined as "1 MN".

In the exemplary embodiment shown in FIG. 9, the number of valid slots to which the COT indicator transmitted in the slot #4 is applied may be two. In the exemplary embodiment shown in FIG. 10, the number of valid slots to which the COT indicator transmitted in the slot #5 is applied may be one. In the exemplary embodiment shown in FIG. 11, the COT indicator transmitted in the slot #5 may be applied to the slot(s) located after the COT. Accordingly, there may be no valid slots to which the COT indicator transmitted in the slot #5 is applied among the slots belonging to the COT. In the exemplary embodiment shown in FIG. 12, the number of valid slots to which the COT indicator transmitted in the slot #5 is applied may be three.

Frequency Resource Structure of COT

The COT indicator may include an index of frequency resource. The index of the frequency resource may be an LBT subband index or a carrier index. The index of the frequency resource may be represented in form of a bitmap. One bit of the bitmap may indicate whether an LBT subband or a carrier corresponding to the bit is used for DL transmission. The base station may identify whether LBT subbands or carriers are used by performing an LBT operation, generate the bitmap indicating available LBT subband(s) or available carrier(s), and may transmit the COT indicator including the bitmap.

The terminal may receive the COT indicator from the base station, and may determine the available LBT subband(s) or available carrier(s) for DL transmission based on the bitmap included in the COT indicator. The terminal may perform a monitoring operation on a CORESET(s) in the LBT subband(s) or carrier(s) indicated by the bitmap included in the COT indicator. Therefore, the terminal may not perform the monitoring operation on a CORESET(s) in LBT subband(s) or carrier(s) that are not available for DL transmission.

The base station may configure aggregated carriers in the terminal. A width of the activated cell or activated BWP may not be greater than a width of the LBT subband. Alternatively, the width of the BWP activated in the carrier configured in the terminal may not be smaller than the width of the LBT subband. The base station may configure a single carrier in the terminal without carrier aggregation. When the width of the single carrier is not greater than the width of the LBT subband, the terminal may not perform a decoding operation according to the frequency structure indicated by the COT indicator.

Method of Configuring a Bitmap Included in a COT Indicator

The base station may not be able to use all of the unlicensed bands. In this case, the base station may configure some LBT subband(s) to the terminal. The index of the carrier and/or the index of the LBT subband may be used to configure frequency resources for the terminal. The index of the carrier may indicate frequency resources belonging to the corresponding carrier, and the index of the LBT subband may indicate frequency resources belonging to the corresponding LBT subband.

The base station may transmit system information including frequency resource information (e.g., COT indicator) to the terminal. The terminal may receive the system information from the base station, and may identify the COT indicator included in the system information. That is, the terminal may identify the frequency resources based on the bitmap included in the COT indicator.

The base station may configure the COT indicator to the terminal using higher layer signaling. In this case, the base station may explicitly inform the terminal of the location of the carrier in the frequency domain. The location of the carrier may be a center frequency, a starting location of a common PRB (e.g., point A), and/or an absolute radio-frequency channel number (ARFCN). The base station may configure a CORESET and a search space, and may inform the terminal of a DCI format used for transmission of the COT indicator using higher layer signaling.

The operation of the base station may be performed in contiguous frequency resources. Accordingly, the base station may inform the terminal of a reference frequency resource and/or a reference bandwidth. The frequency resource information may include an index of the lowest frequency band, the number of frequency bands, and the like. The base station may inform the terminal of a function according to a combination of the index of the lowest frequency band and the number of frequency bands. For example, the frequency resource information may be a start and length indicator value (SLIV).

Since the bandwidth of the base station is predetermined, an index representing the entire unlicensed band may be defined. The range of the index may be determined based on the number of LBT subbands belonging to the entire unlicensed band.

The base station may inform the terminal of one index. The terminal may receive one index from the base station and may identify the frequency resources of the COT secured by the base station based on the one index. S may be a carrier index of the unlicensed band. S set to 0 may indicate a carrier with the lowest frequency resource(s). N may indicate the number (e.g., the maximum number) of carriers that can be supported by the base station. N may be an integer equal to or greater than 1. The maximum value of N may be a value obtained by dividing the total width of the unlicensed band by 20 MHz. N may mean the size of the bitmap. The order of bits constituting the bitmap may be ascending or descending order of the frequency bands.

When the total width of the unlicensed band is X MHz and the width of the LBT subband or the width of the carrier is Y MHz, the maximum value of N may be Z (=X/Y). When defined as "1≤N≤Z−S", SNIV may be defined as in Equation 1 below.

$$SNIV = \begin{cases} Z \cdot (N-1) + S & \text{if } N - 1 \leq \lfloor Z/2 \rfloor \\ Z \cdot (Z - N + 1) + Z - 1 - S & \text{otherwise} \end{cases} \quad \text{[Equation 1]}$$

Time Resource Structure of COT and BWP Configuration Method

The slot format may be different for each LBT subband or carrier. For example, a symbol A may be used as a DL resource in the LBT subband #1, and the same symbol A may be used as a UL resource in the LBT subband #2. The LBT subband #1 may be contiguous with the LBT subband #2 in the frequency domain. Alternatively, the LBT subband #1 may be discontinuous with the LBT subband #2 in the frequency domain. This may mean full duplex communication. Thus, a plurality of LBT subbands may be configured when the base station uses a plurality of RF chains.

The base station may configure a DL carrier, a DL BWP, a UL carrier, and a UL BWP to the terminal using higher layer signaling. In the communication system supporting the FDD scheme, a distance between a center frequency of the DL carrier and a center frequency of the UL carrier may be a duplex gap. In the communication system supporting the TDD scheme, a center frequency of the DL carrier may be the same as a center frequency of the UL carrier, and a center frequency of the DL BWP may be the same as a center frequency of the UL BWP. A pair of the DL BWP and the UL BWP having the same center frequency may be activated.

When a plurality of LBT subbands are used in the unlicensed band, the base station may activate a DL BWP and a UL BWP having different center frequencies. The base station may secure a COT by performing an LBT operation, and may transmit a COT indicator indicating a time resource structure of the secured COT to the terminal(s). The LBT subband #1 may be used as a DL carrier, and the LBT subband #2 may be used as a UL carrier.

Method for Configuring a Channel Access Type (e.g., Type of LBT Operation) Using a UL Grant and a COT Indicator The terminal may receive a UL grant on a PDCCH and may transmit a PUSCH based on the UL grant. The UL grant may include index(es) of LBT subband(s) to which the PUSCH is mapped and index(es) of PUSCH interlace(s) needed in the activated UL BWP. In addition, the UL grant may include the type of LBT operation performed for transmission of the PUSCH. The channel access type (e.g., the type of LBT operation) may be classified into no LBT, C1 LBT, C2 LBT, and C4 LBT.

The base station may independently determine the LBT subband(s) in which the LBT operation can be performed, and inform the terminal of a bitmap indicating the LBT subband(s) in which the LBT operation can be performed. One bit included in the bitmap may indicate that one or more LBT subbands are allocated to the terminal.

In addition, the base station may independently allocate interlaces to the terminal. Here, the interlace may be a PUSCH interlace. For example, the base station may inform the terminal of a bitmap or an index indicating the interlace(s). One bit included in the bitmap may indicate that one or more interlaces are allocated to the terminal. The interlace(s) allocated to the terminal may be indicated by a combination of the indexes. The combination of indexes may be a combination of an index of a starting interlace and an index indicating the number of consecutive interlaces.

The interlace (e.g., PUSCH interlaces) may be indicated differently depending on the subcarrier spacing of the activated BWP. For example, when the subcarrier spacing of the BWP is 30 kHz, the interlace may be indicated by the bitmap. When the subcarrier spacing of the BWP is 15 kHz, the interlace may be indicated by the index. One index may indicate a combination of one or more interlaces. The indication method of interlace may be determined in consideration of the overhead of DCI. If the number of interlaces is small, the frequency resources may be allocated by the bitmap indicating the interlace. Since the size of the bitmap increases with the number of interlaces, when the number of interlaces is large, the frequency resources may be allocated by an index indicating the interlace. In this case, the degree of freedom may be reduced, but the overhead of DCI may be reduced.

The UL grant may include the type of LBT operation performed for the transmission of the PUSCH. However, the C4 LBT operation may not be performed in the LBT subband secured by the base station. If the UL grant indicates no LBT, C1 LBT, or C2 LBT, the terminal may perform the LBT operation indicated by the UL grant in the LBT subband(s) indicated by the UL grant, and map the PUSCH to resources secured by the LBT operation.

When the UL grant indicates C4 LBT, and one or more LBT subbands among the LBT subbands allocated to the terminal have already been secured by the base station, the terminal may perform the C4 LBT operation in the remaining LBT subbands except one or more LBT subbands among all the LBT subbands. The terminal may determine the type of LBT operation performed in the LBT subband(s) to which the PUSCH is to be mapped using other information (e.g., COT indicator) in addition to the UL grant.

Meanwhile, the terminal may transmit a PUSCH according to a configured grant. In this case, the terminal may not perform the C4 LBT operation in a specific LBT subband. For example, the terminal may identify the LBT subband(s)

secured by the base station based on the COT indicator, and may perform no LBT operation, the C1 LBT operation, or the C2 LBT operation in the LBT subband(s) secured by the base station.

When the terminal transmits the PUSCH in a single LBT subband according to the configured grant, no LBT operation, the C1 LBT operation, or the C2 LBT operation may be performed in the single LBT subband. When the terminal transmits the PUSCH in a plurality of LBT subbands according to the configured grant, no LBT operation, the C1 LBT operation, or the C2 LBT operation may be performed in one or more LBT subbands among the plurality of LBT subbands. In the remaining LBT subband(s), the C4 LBT operation may be performed.

Channel Access Method for Each LBT Subband in a Wideband BWP

The UL grant may be used to schedule PUSCH transmissions. The UL grant may be transmitted to the terminal through a PDCCH (e.g., DCI), higher layer signaling, or a combination of a PDCCH and higher layer signaling. The base station may activate a wide UL BWP. In this case, the base station may transmit to the terminal a UL grant including resource information of the PUSCH allocated to the plurality of LBT subbands within the activated wide UL BWP.

The frequency resource(s) of the PUSCH indicated by the UL grant may be LBT subband(s) not secured according to the LBT operation performed by the base station. The base station may transmit a UL grant indicating a channel access type (e.g., the type of LBT operation) to the terminal. The UL grant may indicate C4 LBT. The terminal may receive the UL grant from the base station, and may secure the LBT subband(s) by performing the LBT operation (e.g., C4 LBT operation) based on the information included in the UL grant, and may transmit the PUSCH in the secured LBT subband(s).

In a proposed method, the frequency resource(s) of the PUSCH indicated by the UL grant may be the LBT subband(s) secured by the LBT operation performed by the base station. The base station may transmit a UL grant indicating a channel access type (e.g., C2 LBT) to the terminal. The terminal may receive the UL grant from the base station, and may secure the LBT subband(s) by performing the LBT operation (e.g., C2 LBT operation) based on the information included in the UL grant, and may transmit the PUSCH in the secured LBT subband(s).

Meanwhile, the frequency resource(s) of the PUSCH indicated by the UL grant may include LBT subband(s) secured by the LBT operation performed by the base station and LBT subband(s) not secured by the LBT operation performed by the base station. For example, PUSCH information #1 included in the UL grant may indicate the LBT subband(s) secured by the LBT operation performed by the base station. PUSCH information #2 included in the UL grant may indicate the LBT subband(s) not secured by the LBT operation performed by the base station.

In consideration of the use efficiency of frequency resources, the operation of assigning the PUSCH in the LBT subband not secured by the LBT operation may be more advantageous than the operation of assigning the PUSCH in the LBT subband secured by the LBT operation. The terminal may transmit the PUSCH by performing the LBT operation on one or more LBT subband(s) secured by the base station among the LBT subbands indicated by the UL grant.

In a proposed method, one UL grant may indicate a plurality of channel access types (e.g., C2 LBT and C4 LBT). The channel access type may be different for each LBT subband. One UL grant may indicate the channel access type applied to each of the LBT subbands. Since one UL grant indicates a plurality of channel access types, the size of one UL grant may increase. Therefore, the DCI size or higher layer signaling size may increase. The size of the UL grant may be changed according to the size of the UL BWP activated in the terminal.

In a proposed method, to maintain the size of the UL grant, one UL grant may indicate one channel access type (e.g., type of LBT operation). The UL grant may indicate no LBT, C1 LBT, or C2 LBT. In this case, the terminal may perform no LBT operation, C1 LBT operation, or C2 LBT operation indicated by the corresponding UL grant in all LBT subbands to which the PUSCH indicated by the UL grant belongs. The terminal may determine that all the LBT subbands to which the PUSCH indicated by the UL grant belongs are secured by the LBT operation performed by the base station. Even in this case, the UL grant may indicate C4 LBT. Accordingly, the terminal may perform the C4 LBT operation indicated by the UL grant even in the LBT subband(s) secured by the LBT operation performed by the base station. Alternatively, one or more LBT subband(s) capable of performing no LBT operation, the C1 LBT operation, or the C2 LBT operation among the LBT subband(s) secured by the LBT operation performed by the base station may be identified based on the COT indicator. The terminal may perform no LBT operation, the C1 LBT operation, or the C2 LBT operation in the one or more LBT subband(s) identified by the COT indicator.

In a proposed method, when the UL grant indicates C4 LBT, the terminal may perform the C4 LBT operation in all LBT subbands to which the PUSCH indicated by the corresponding UL grant belongs. The terminal may identify the LBT subband(s) secured by the LBT operation performed by the base station based on the COT indicator, and may perform the C4 LBT operation on the LBT subband(s) identified by the COT indicator. According to this method, the execution time for the LBT operation is performed on the LBT subband(s) secured by the base station may be shorter than the time defined in the 3GPP technical specification (e.g., 0 ms, 16 ms, or 25 ms). Therefore, the terminal may determine that another terminal or the base station is already performing transmission. Since a defer time according to the C4 LBT operation is larger than the preconfigured time, the LBT operation may fail in the LBT subband on which the C4 LBT operation is performed.

In a proposed method, the terminal may perform no LBT operation, the C1 LBT operation, or the C2 LBT operation in one or more LBT subband (s) indicated by the COT indicator among the LBT subbands indicated by the UL grant. The terminal may perform the C4 LBT operation on the remaining subband(s) except for one or more LBT subband(s) indicated by the COT indicator among the LBT subband(s) indicated by the UL grant. That is, the type of LBT operation performed by the terminal may be determined by the COT indicator as well as the UL grant. According to this method, the execution time of the LBT operation of the terminal on the LBT subband(s) secured by the base station may be shorter than the time (e.g., 0 ms, 16 ms, or 25 ms) defined in the 3GPP technical specification. Therefore, the terminal may determine that another terminal or the base station is already performing transmission. In this case, when the terminal performs the C4 LBT operation, the LBT operation may fail in the corresponding LBT subband. When the terminal performs no LBT operation, the C1 LBT operation, or the C2 LBT operation, the LBT operation may succeed in the corresponding LBT subband.

Figure 13:
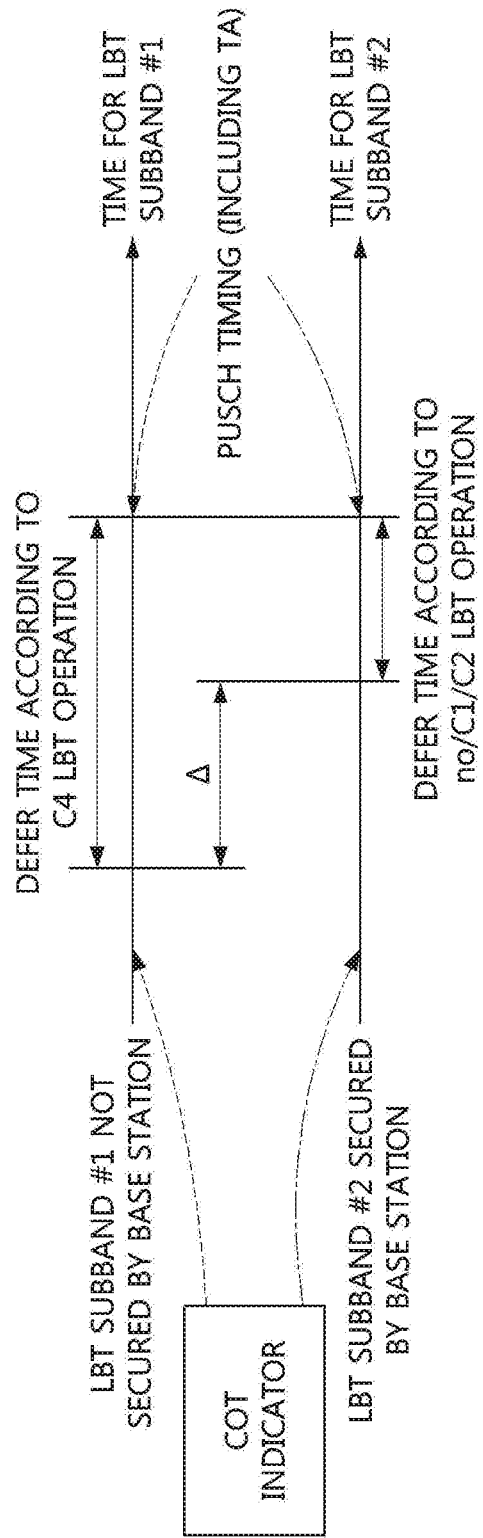
FIG. 13 is a conceptual diagram illustrating a first exemplary embodiment of a method of performing an LBT operation in a communication system.

FIG. 13 is a conceptual diagram illustrating a first exemplary embodiment of a method of performing an LBT operation in a communication system.

Referring to FIG. 13, the terminal may receive a UL grant from the base station through DCI, higher layer signaling, or a combination of DCI and higher layer signaling. The UL grant may indicate that the C4 LBT operation is performed on LBT subbands #1 and #2. In addition, the terminal may receive a COT indicator for the LBT subbands #1 and #2 from the base station. The COT indicator may indicate a channel access state of the base station in the LBT subbands #1 and #2. For example, the COT indicator may indicate that LBT subband #1 is not secured by the LBT operation performed by the base station and that LBT subband #2 is secured by the LBT operation performed by the base station.

The terminal may determine the type of LBT operation based on the UL grant and the COT indicator. For example, the terminal may perform the C4 LBT operation on the LBT subband #1, and may perform no LBT operation, the LBT operation, or the LBT operation on the LBT subband #2. The starting time of the LBT operation on the LBT subband #1 may be different from the starting time of the LBT operation on the LBT subband #2.

When the LBT operation fails in one or more LBT subbands among the LBT subbands to which the PUSCH assigned by the base station belongs, the terminal may not transmit the PUSCH in one or more LBT subbands in which the LBT operation fails. Accordingly, the terminal may transmit the PUSCH in the LBT subband(s) in which the LBT operation is successful among the LBT subbands. Alternatively, when there are LBT subband(s) in which the LBT operation fails, the terminal may not transmit the PUSCH in all LBT subbands.

Method of Transmitting a PUSCH in a Time Shared by the Base Station

The base station may transmit a UL grant for scheduling a PUSCH to the terminal through DCI, an RRC message, or a combination of DCI and an RRC message. The time resource information of the PUSCH included in the UL grant may indicate a plurality of slots (hereinafter, referred to as 'PUSCH occasion'). The PUSCH occasion may include a plurality of PUSCH instances. One PUSCH instance may be a time interval in which one PUSCH is transmitted. The mapping type between the PUSCH and the PUSCH instance may be classified into a mapping type A (e.g., PUSCH mapping type A) and a mapping type B (e.g., PUSCH mapping type B). In the mapping type A, the PUSCH instance may be a time interval configured in units of slots. In the mapping type B, the PUSCH instance may be a time interval configured in units of mini-slots. The number of symbols included in the slot may be greater than the number of symbols included in the mini-slot. As the number of PUSCH instances increases, the number of executions of the C4 LBT operation may increase.

The PUSCH instance may correspond to one HARQ process. Therefore, one PUSCH occasion may be preferably composed of a plurality of PUSCH instances. For example, a first slot of the PUSCH occasion may be configured based on the mapping type B. Accordingly, the first slot of the PUSCH occasion may include a plurality of PUSCH instances. The remaining slot(s) except the first slot among the slots constituting the PUSCH occasion may be configured based on the mapping type A.

The base station may configure one LBT subband to the terminal. The terminal may perform the LBT operation on the LBT subband configured by the base station, and may transmit the PUSCH in the corresponding LBT subband when the LBT operation is successful. The terminal may identify the channel access type (e.g., no LBT, C1 LBT, C2 LBT, or C4 LBT) indicated by the UL grant. The base station may transmit configuration information for reception of a COT indicator to the terminal using higher layer signaling. In this case, the terminal may identify the starting position and the ending position of the time interval (e.g., COT) secured by the base station.

The PUSCH occasion may overlap with the time interval secured by the base station. In this case, the terminal may not know whether to change the type of the LBT operation based on the COT indicator. When the change of the type of the LBT operation is not allowed, the terminal may perform the LBT operation (e.g., no LBT operation, C1 LBT operation, C2 LBT operation, or C4 LBT operation) indicated by the UL grant. When the change of the type of the LBT operation is allowed, the terminal may perform no LBT operation, the C1 LBT operation, or the C2 LBT operation (e.g., LBT operation indicated by the COT indicator) even when the UL grant indicates the C4 LBT operation.

In order to apply the scheme described above, various cases may be considered. In the first case, all PUSCH instances included in the PUSCH occasion may belong to the time interval secured by the LBT operation performed by the base station. In this case, the terminal may determine (or change) the type of LBT operation performed in the PUSCH occasion in consideration of both the UL grant and the COT indicator.

In the second case, some PUSCH instance(s) among all the PUSCH instances included in the PUSCH occasion may belong to the time interval secured by the LBT operation performed by the base station. In particular, only some symbol(s) included in the PUSCH instance may belong to the time interval secured by the base station. The type of LBT operation performed in some PUSCH instance(s) (e.g., some symbol(s) included in the PUSCH instance) belonging to the time interval secured by the base station may be determined (or, changed) in consideration of both the UL grant and the COT indicator. The PUSCH instance partially overlapping the time interval secured by the base station may include symbol(s) belonging to the time interval secured by the base station and symbol(s) not belonging to the time interval secured by the base station.

In a proposed method, when one or more PUSCH instances belonging to the PUSCH occasion do not belong to the time interval secured by the base station, the terminal may not change the category (e.g., channel access type) of the LBT operation in all the PUSCH instances belonging to the PUSCH occasion. When all the PUSCH instances belonging to the PUSCH occasion belong to the time interval secured by the base station, the terminal may change the category of the LBT operation. The PUSCH occasion may be regarded as one resource, and a transmission opportunity of the terminal may be configured in units of PUSCH occasions. Alternatively, the PUSCH instance may be regarded as one resource, and a transmission opportunity of the terminal may be configured in units of PUSCH instances. In the case where the PUSCH instance is regarded as one resource, the transmission opportunities of the terminal may be greater than the transmission opportunities of the terminal when the PUSCH occasion is regarded as one resource.

In a proposed method, the terminal may not transmit the PUSCH in the PUSCH instance including the symbol that does not belong to the time interval secured by the base station. That is, the terminal may transmit the PUSCH in the PUSCH instance(s) belonging to the time interval secured by the base station among the PUSCH instances included in the PUSCH occasion. The base station may consider that all symbols included in the PUSCH instance are symbols allocated by the base station. Alternatively, the base station may consider that the PUSCH is not transmitted in a specific PUSCH instance.

In a proposed method, the terminal may transmit the PUSCH in the symbol(s) belonging to the time interval secured by the base station among all symbols included in the PUSCH instance. For transmission of the PUSCH, a rate matching operation or puncturing operation in units of symbols may be performed in the PUSCH instance. The PUSCH instances configured in the terminal may be PUSCH instances according to the mapping type A or PUSCH instances according to the mapping type B. When the rate matching operation is performed, the terminal may identify the number of mappable symbols based on the UL grant and the COT indicator, determine the size of the resource based on the number of mappable symbols, and determine a size of a transport block (TB) based on the size of the resource.

In a proposed method, the terminal may perform a rate matching operation or puncturing operation in units of symbols without distinguishing between DM-RS and data (e.g., configured grant (CG)-UCI, UCI, and UL shared channel (UL-SCH)). That is, the terminal may transmit the PUSCH in the time interval secured by the base station without any additional operation. The terminal may determine that some symbol(s) among all symbols included in the PUSCH instance are available, and may transmit the PUSCH in the corresponding PUSCH instance. When the number of unavailable symbols in the PUSCH instance is greater than the number of available symbols or when the number of PUSCH instances having any unavailable symbol(s) is greater than the number of PUSCH instances having only available symbols in the PUSCH occasion, the terminal may not transmit the corresponding PUSCH instance(s) (e.g., PUSCH instance(s) having unavailable symbol(s)).

In a proposed method, the terminal that has transmitted the DM-RS may expect that the number of symbols in which data is to be transmitted is greater than the preconfigured number of symbols. When the number of symbols in which data is to be transmitted is not greater than the preconfigured number of symbols, the terminal may not transmit the PUSCH in the corresponding PUSCH instance. Here, the preconfigured number may be defined in the 3GPP technical specification. Alternatively, the preconfigured number may be configured by higher layer signaling.

When the number of available symbols is less than the preconfigured number of symbols, the terminal may not use the symbol(s) belonging to the time interval secured by the base station. Accordingly, the terminal may not transmit DM-RS and data in the corresponding PUSCH instance. This is because the base station does not successfully decode data even when the base station performs a reception operation on the corresponding PUSCH instance. Since the terminal does not transmit the PUSCH in the PUSCH instance, interference may be reduced in the communication system. The terminal may perform the C4 LBT operation to transmit the PUSCH in the PUSCH instance belonging to a time interval not secured by the base station. When one or more symbols included in the PUSCH instance do not belong to the time interval secured by the base station, the terminal may perform the C4 LBT operation on one or more symbols.

In the third case, all the PUSCH instances belonging to the PUSCH occasion may completely belong to the time interval secured by the LBT operation performed by the base station. Alternatively, all the PUSCH instances belonging to the PUSCH occasion may not belong to the time interval secured by the LBT operation performed by the base station. In this case, the terminal may transmit the PUSCH in the PUSCH instance(s) belonging to the time interval secured by the base station, and may perform the C4 LBT operation in the PUSCH instance(s) not belonging to the time interval secured by the base station.

The time at which the C4 LBT operation is performed may be subdivided. The base station may inform the terminal of the time subdivided for the C4 LBT operation. The PUSCH instance completely belonging to the time interval secured by the base station may be referred to as a PUSCH instance #n, and the PUSCH instance not belonging to the time interval secured by the base station may be referred to as a PUSCH instance #n+1. The PUSCH instance #n+1 may be contiguous with the PUSCH instance #n in the time domain. Alternatively, the PUSCH instance #n+1 may be discontinuous with the PUSCH instance #n in the time domain.

In a proposed method, the terminal may perform the C4 LBT operation on the last symbol of the PUSCH instance #n. The terminal may not transmit the last sample among samples constituting the last symbol of the PUSCH instance #n. That is, the terminal may perform the C4 LBT operation in the last sample. Alternatively, the terminal may not perform a transmission operation in the last symbol of the PUSCH instance #n. In this case, the terminal may determine that the number of symbols available in the PUSCH instance #n is smaller than the number of symbols available in other PUSCH instances. Accordingly, the terminal may not transmit data in the last symbol by performing a puncturing operation or a rate matching operation on the last symbol of the PUSCH instance #n.

Alternatively, the terminal may map the same data as the data mapped to the symbol before the last symbol of the PUSCH instance #n to the last symbol. The same data may be mapped to two consecutive symbols. That is, the data mapped to the symbol before the last symbol may be cyclically extended to the last symbol. In this case, the terminal may determine that the number of symbols available in the PUSCH instance #n is smaller than the number of symbols available in other PUSCH instances. Accordingly, the terminal may perform a puncturing operation or a rate matching operation on the PUSCH instance #n.

In a proposed method, the terminal may perform the C4 LBT operation on the starting symbol of the PUSCH instance #n+1. The terminal may not transmit the first sample among samples constituting the starting symbol of the PUSCH instance #n+1. That is, the terminal may perform the C4 LBT operation on the first sample. In a proposed method, data mapped to the starting symbol of the PUSCH instance #n+1 may be transmitted.

Alternatively, the same data as the data mapped to the second symbol of the PUSCH instance #n+1 may be mapped to the starting symbol (i.e., the first symbol) of the PUSCH instance #n+1. The same data may be mapped to two consecutive symbols. That is, the data mapped to the second symbol may be cyclically extended to the first symbol. The same data as the data mapped to the second symbol may be mapped to the samples of the first symbol. In this case, the terminal may determine that the number of symbols available in the PUSCH instance #n+1 is smaller than the number of symbols available in other PUSCH instances. Accordingly, the terminal may perform a puncturing operation or a rate matching operation on the PUSCH instance #n+1.

Figure 14:
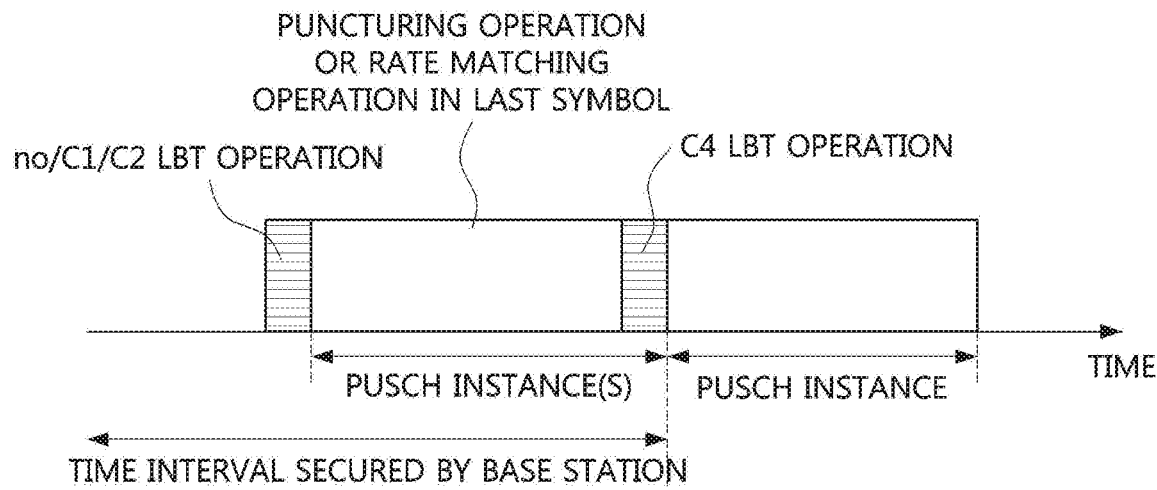
FIG. 14 is a conceptual diagram illustrating a second exemplary embodiment of a method of performing an LBT operation in a communication system.

FIG. 14 is a conceptual diagram illustrating a second exemplary embodiment of a method of performing an LBT operation in a communication system.

Referring to FIG. 14, a PUSCH occasion may include a plurality of PUSCH instances. One or more PUSCH instances among the plurality of PUSCH instances included in the PUSCH occasion may belong to a time interval (e.g., COT) secured by the base station, and the remaining PUSCH instance(s) may not belong the time interval secured by the base station. The terminal may perform no LBT operation, the C1 LBT operation, or the C2 LBT operation in the PUSCH instance(s) belonging to the time interval secured by the base station. The terminal may perform the C4 LBT operation in the PUSCH instance that does not belong to the time secured by the base station.

The LBT operation for the PUSCH instance #n may be performed in the last symbol of the PUSCH instance #n−1 located before the PUSCH instance #n. Therefore, the C4 LBT operation may be performed in the last symbol of the last PUSCH instance belonging to the time interval secured by the base station. That is, the terminal may transmit the PUSCH by performing a puncturing operation or a rate matching operation on the last PUSCH instance belonging to the time interval secured by the base station.

Figure 15:
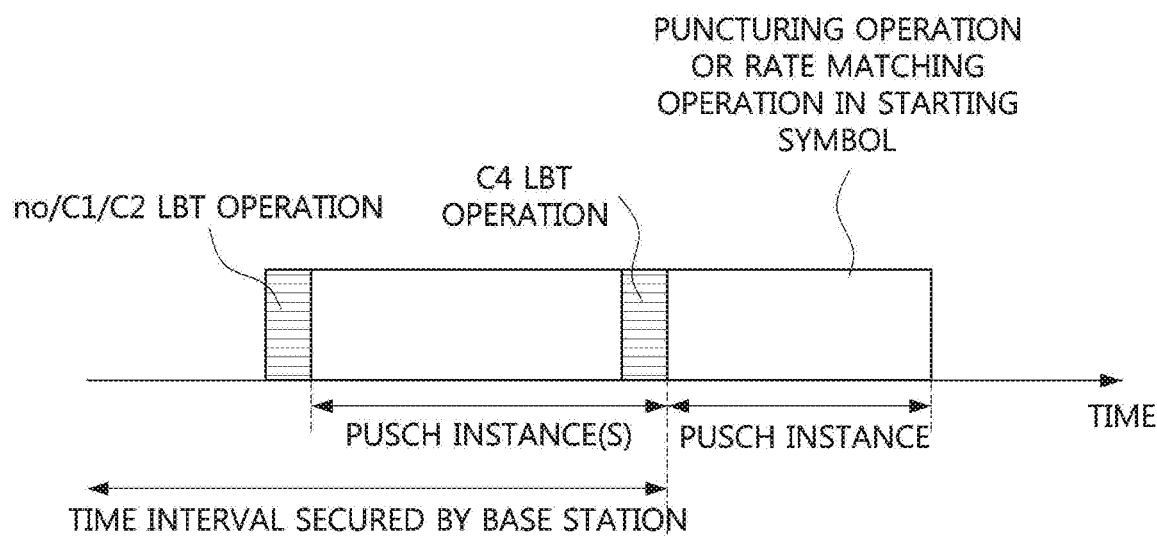
FIG. 15 is a conceptual diagram illustrating a third exemplary embodiment of a method of performing an LBT operation in a communication system.

FIG. 15 is a conceptual diagram illustrating a third exemplary embodiment of a method of performing an LBT operation in a communication system.

Referring to FIG. 15, a PUSCH occasion may include a plurality of PUSCH instances. One or more PUSCH instances among the plurality of PUSCH instances included in the PUSCH occasion may belong to a time interval (e.g., COT) secured by the base station, and the remaining PUSCH instance(s) may not belong the time interval secured by the base station. The terminal may perform no LBT operation, the C1 LBT operation, or the C2 LBT operation in the PUSCH instance(s) belonging to the time interval secured by the base station. The terminal may perform the C4 LBT operation in the PUSCH instance that does not belong to the time secured by the base station.

The LBT operation for the PUSCH instance #n may be performed in the first symbol of the PUSCH instance #n. Therefore, the C4 LBT operation may be performed in the first symbol of the PUSCH instance not belonging to the time interval secured by the base station. That is, the terminal may transmit the PUSCH by performing a puncturing operation or a rate matching operation on the PUSCH instance not belonging to the time interval secured by the base station.

Method of Transmitting a UL Grant Indicating a Plurality of Carriers (e.g., Carriers in a Licensed Band and Carriers in an Unlicensed Band)

The terminal may operate in both the licensed and unlicensed bands. A DL carrier of the licensed band may be referred to as a 'DL licensed carrier' and a UL carrier of the licensed band may be referred to as a 'UL licensed carrier'. A carrier in the unlicensed band may be referred to as an 'unlicensed carrier'. When a DL licensed carrier is aggregated with an unlicensed carrier, the DL licensed carrier may be activated as a carrier of a PCell or a carrier of an SCell. When a UL licensed carrier is aggregated with an unlicensed carrier, the UL licensed carrier may be activated as a carrier for PUCCH transmission. The base station may transmit a UL grant including scheduling information of a PUSCH located in the UL licensed carrier and the unlicensed carrier to the terminal. The UL grant may be transmitted through DCI.

The base station may transmit a UL grant including information explicitly indicating a carrier used for PUSCH transmission to the terminal. A carrier indicator field (CIF) included in the UL grant may indicate the carrier used for PUSCH transmission. The UL grant scheduling the PUSCH transmission in the unlicensed band may include a type of LBT operation (e.g., C2 LBT operation or C4 LBT operation), a PUSCH interlace, and/or a trigger type. The trigger type may indicate whether the terminal receives an additional trigger signal from the base station. The UL grant for scheduling the PUSCH transmission in the licensed band may not include the above information. In the licensed band, the PUSCH may be located in contiguous PRBs or non-contiguous PRBs. A method of allocating a time resource for the PUSCH in the licensed band may be different from a method of allocating a time resource for the PUSCH in the unlicensed band.

In a proposed method, a plurality of DCI formats for the UL grant may be configured in the terminal. A first DCI format may mean a UL grant for PUSCH transmission in the licensed band, and a second DCI format may mean a UL grant for PUSCH transmission in the unlicensed band. The first DCI format and the second DCI format may be mapped to the same search space with the same CORESET. The size of the first DCI format may be different from the size of the second DCI format. A third DCI format may be an UL grant that schedules transmission of a plurality of PUSCHs.

The first DCI format may be classified into a 1-1 DCI format and a 1-2 DCI format. The 1-1 DCI format may be used for a fallback operation. The 1-2 DCI format may be used for an operation other than the fallback operation. In addition, the second DCI format may be classified into a 2-1 DCI format and a 2-2 DCI format, and the third DCI format may be classified into a 3-1 DCI format and a 3-2 DCI format. The 2-1 DCI format and the 3-1 DCI format may be used for the fallback operations. The 2-2 DCI format and the 3-2 DCI format may be used for other operations.

In a proposed method, the type of DCI (e.g., DCI format) for each of the CORESETs (e.g., search spaces) may be distinguished. Accordingly, the terminal may expect to receive one type of UL grant in one CORESET (e.g., one search space). That is, the terminal may expect to receive resource allocation information of a PUSCH of the unlicensed band or resource allocation information of a PUSCH of the licensed band in one CORESET (e.g., one search space).

The DCI format used for scheduling the PUSCH transmission of the licensed band may be the first DCI format or (the 1-1 DCI format and the 1-2 DCI format). The DCI format used for scheduling the PUSCH transmissions in the unlicensed band may be the second DCI format, (the 2-1 DCI format and the 2-2 DCI format), (2-1 DCI format, 2-2 DCI format, and 3-2 DCI format), or (2-1 DCI format, 2-2 DCI format, 3-1 DCI format, and 3-2 DCI format).

Information on a transmission power of the PUSCH may be included in the UL grant. Alternatively, the information on the transmission power of the PUSCH may be transmitted through a separate DCI (e.g., DCI having a specific format). The separate DCI may be used to indicate the transmission power of the PUSCH or an SRS.

Priority in Transmission Power Perspective in a Simultaneous Transmission Procedure The terminal may transmit a PUSCH in an unlicensed band and may transmit a PUCCH in a licensed band. In this case, the terminal may receive a DCI including a UL grant. In addition, the terminal may receive a DCI including DL assignment information, receive DL data through the PDSCH indicated by the DL assignment information, and transmit an HARQ response for the DL data through the PUCCH.

In a proposed method, the transmission power of the terminal may be determined based on a DCI received later among a UL-DCI including the UL grant and a DL-DCI including DL assignment information. For example, the terminal may first receive the UL-DCI including the UL grant and a transmission power control (TPC) of the PUSCH, and then receive the DL-DCI including the DL assignment information and a TPC of the PUCCH. When there is sufficient power for simultaneous transmission of the PUSCH and the PUCCH, the terminal may use the sufficient transmission power for transmission of the PUCCH based on the TPC included in the DL-DCI received after the UL-DCI, and use the remaining transmission power for transmission of the PUSCH.

Alternatively, the terminal may first receive the DL-DCI including the DL assignment information and the TPC of the PUCCH, and then receive the UL-DCI including the UL grant and the TPC of the PUSCH. When there is insufficient power for simultaneous transmission of the PUSCH and the PUCCH, the terminal may use the sufficient transmission power for transmission of the PUSCH based on the TPC included in the UL-DCI received after the DL-DCI, and use the remaining transmission power for transmission of the PUCCH.

In a proposed method, the terminal may select one channel among a plurality of channels according to preconfigured priorities, and determine a transmission power for the one channel. The terminal may select the PUSCH or the PUCCH according to the priorities according to the 3GPP technical standard or higher layer signaling instead of the reception order of the DL-DCI and the UL-DCI. The terminal may first use sufficient transmission power for transmission of the selected channel (e.g., PUSCH or PUCCH). The priority of the PUCCH for transmission of UCI including an HARQ response may be different from the priority of the PUCCH for transmission of UCI including a CSI.

For example, the priority of the UL grant may be higher than the priority of CSI (e.g., periodic CSI reporting). The priority of the UL grant may be lower than the priority of the HARQ response. The terminal may use sufficient transmission power for transmission of UCI (e.g., PUCCH) including an HARQ response or (HARQ response and CSI), and may use the remaining transmission power for transmission of the PUSCH. Alternatively, the terminal may use sufficient transmission power for transmission of the PUSCH and use the remaining transmission power for transmission of UCI (e.g., PUCCH) including a CSI.

Method of Allocating Frequency Resources Belonging to a Plurality of LBT Subbands in a Transmission Procedure of PDSCH/PUSCH/PUCCH/SRS in an Unlicensed Band The base station may succeed in an LBT operation in a plurality of LBT subbands. In this case, the base station may transmit data to the terminal using the plurality of LBT subbands. When the terminal operates in one LBT subband (e.g., when a UL BWP is activated in one LBT subband), the terminal may receive a UL grant including an index of a PUSCH interlace from the base station. The index of the PUSCH interlace may be indicated by a specific bit of a bitmap included in the UL grant.

The UL BWP may be activated in the plurality of LBT subbands, and the UL grant may indicate the index of the PUSCH interlace. As many terminals as the number of PUSCH interlaces may be multiplexed in the frequency domain. The number of terminals multiplexed in the frequency domain may be small. In order to multiplex a large number of terminals in the frequency domain, a large amount of time may be required. The maximum time interval that can be occupied by the base station and/or the terminal in the unlicensed band may be determined according to the spectrum regulation.

It may be preferable to multiplex a plurality of terminals in the frequency domain in the same time interval. For example, a plurality of terminals associated with one PUSCH interlace may be multiplexed in the frequency domain. When the terminal transmits a small TB, a required BWP width may be small. Alternatively, a portion of the PUSCH interlace (e.g., a portion of frequency resources) within the BWP may be allocated to the terminal.

In a proposed method, when allocating frequency resources of the PUSCH, the base station may inform the terminal of an index indicating the LBT subband. In the procedure of determining the frequency resources of the PUSCH, the terminal may derive PRBs (e.g., the starting PRB index, the ending PRB index, and the number of PRBs belonging to the PUSCH interlace) to which the encoded TB is to be mapped based on the BWP index, the index(es) of the PUSCH interlace(s), and the index(es) of the LBT subband(s).

In the PUSCH transmission procedure, the UL grant may include information indicating the UL BWP and the index of the PUSCH interlace. Depending on a subcarrier spacing of the PUSCH, the index of the PUSCH interlace may be indicated by a bit string or an index indicating a combination of a starting position and a length. A PUSCH interlace belonging to the UL BWP may be selected, and one or more PRB(s) among the PRBs indicated by the index of the selected PUSCH interlace may be selected based on the index(es) of the LBT subband(s). The selected one or more PRB(s) may be configured as the PUSCH, and may belong to the LBT subband indicated by the index of the LBT subband.

A guard band may be placed between adjacent LBT subbands. When different base stations or different terminals perform transmission in adjacent LBT subbands, interference may occur. In this case, it may be preferable to allocate a guard band having a sufficient size. In a proposed method, the position and size of the guard band may be defined for each LBT subband. The position and size of the guard band may be defined in the 3GPP technical specification. Alternatively, the base station may transmit information indicating the position and size of the guard band to the terminal.

When the LBT subband to which the frequency resources (e.g., UL BWP, bit string (or, index) of PUSCH interlace, bit string (or, index) of LBT subband) allocated by the UL grant belong is adjacent to an LBT subband for another terminal, the terminal may map the encoded TB to PRB(s) belonging to the guard band for the LTB subbands. For example, if transmission is allowed in the adjacent LBT subbands, the terminal may map the encoded TB to PRB(s) belonging to the guard band for the adjacent LBT subbands.

The terminal may derive the index(es) of the PRB(s) belonging to the guard band based on the subcarrier spacing of the BWP and the point A. In a proposed method, when a plurality of UL transmissions occurs simultaneously and one or more UL transmissions among the plurality of UL transmissions are PUSCH transmission(s), the terminal may map the encoded TB to the guard band between the adjacent LBT subbands.

When the time intervals of the PUSCHs indicated by a plurality of UL grants are the same, the PUSCH may be multiplexed in the frequency domain. The first UL grant may include allocation information of PUSCH interlace(s) belonging to a specific LBT subband(s), and the second UL grant received after the first UL grant may include allocation information of PUSCH interlace(s) belonging to the LBT subband(s) adjacent to the specific LBT subband indicated by the first UL grant. In this case, the terminal may map the encoded TB to PRB(s) belonging to the guard band between the adjacent LBT subbands. The PUSCH interlace(s) allocated by the first UL grant may be the same as the PUSCH interlace(s) allocated by the second UL grant. Alternatively, the PUSCH interlace(s) allocated by the first UL grant may be different from the PUSCH interlace(s) allocated by the second UL grant. The terminal may map a TB allocated by one or more UL grants among the first UL grant and the second UL grant to the PRB(s) belonging to the guard band.

The PUSCH scheduled by one UL grant may be transmitted in the first LBT subband, and a PUCCH (or SRS) may be transmitted in the second LBT subband adjacent to the first LBT subband. The PUSCH and the PUCCH (or SRS) may be transmitted in the same time interval. When the LBT subbands are adjacent, the terminal may transmit the PUSCH in the first LBT subband and transmit the PUCCH (or SRS) in the second LBT subband adjacent to the first LBT subband. A PUCCH (or SRS) interlace may be the same as the PUSCH interlace. Alternatively, the PUCCH (or SRS) interlace may be different from the PUSCH interlace. Here, the interlace may be configured in units of PRBs or REs. In a proposed method, the terminal may transmit the PUSCH in the PRB(s) belonging to the guard band between the LBT subbands. The size of the TB mapped to the PUSCH may be determined according to a result of the rate matching operation (e.g., the result of the operation of mapping the TB to the PRB(s) belonging to the guard band).

The PUCCH may be transmitted using frequency resources confined to one LBT subband. The SRS may be transmitted in a plurality of LBT subbands. In a proposed method, the terminal may multiplex the SRS with the PUSCH in the frequency domain. In this case, the terminal may perform one UL transmission (e.g., SRS transmission) in the PRB(s) belonging to the guard band between the LBT subbands. When the SRS interlace is configured in units of subcarriers, the PUSCH and the SRS may not be multiplexed in the frequency domain of the guard band. The terminal may not adjust the size of the TB mapped to the PUSCH according to whether to transmit the SRS. That is, the PRB(s) to which the TB is mapped may not include the PRB(s) belonging to the guard band.

When a PDSCH and/or a PDCCH are not received, the terminal may not transmit the PUCCH according to discontinuous transmission (DTX). In this case, the terminal may not know whether to transmit PUCCH and may not transmit both the PUCCH and the PUSCH in the adjacent LBT subbands. Therefore, the terminal may not perform transmission in the PRB(s) belonging to the guard band between the LBT subbands. The size of the TB mapped to the PUSCH may be determined according to the result of the rate matching operation. The PRB(s) to which the TB is mapped may not include the PRB(s) belonging to the guard band.

The terminal may transmit the SRS and the PUCCH in the same time interval. The first LBT subband in which the SRS is transmitted may be adjacent to the second LBT subband in which the PUCCH is transmitted. In this case, the guard band between the LBT subbands may not be used. Alternatively, the terminal may transmit the SRS through the PRB(s) belonging to the guard band between the LBT subbands.

The SRS may be transmitted through a plurality of LBT subbands. One or more LBT subbands among the plurality of LBT subbands through which the SRS is transmitted may be used for PUCCH transmission. The SRS may be transmitted in the PRB(s) belonging to the guard band between the LBT subbands. Alternatively, the terminal may select one UL transmission among a plurality of UL transmissions (e.g., SRS or PUCCH), and the selected one UL transmission may be performed in the PRB(s) belonging to the guard band.

Method of Interpreting Fields Included in DCI as the BWP Switching

The DCI may include resource allocation information of the PDSCH or resource allocation information of the PUSCH, and the BWP through which the PDSCH or the PUSCH is transmitted by the corresponding DCI may be switched from a BWP #1 to a BWP #2. When the width of the BWP #1 is different from the width of the BWP #2, the size of fields indicating frequency resources in the DCI may be different. The resource(s) of the PDSCH or PUSCH allocated in the BWP #2 may be indicated by decreasing or increasing the size of all fields of the DCI transmitted in the BWP #1. This operation may be considered when the DCI transmitted in the BWP #1 indicates the resource(s) in the BWP #2. "Reducing the size of all fields of the DCI" may mean "omitting a most significant bit (MSB) or a least significant bit (LSB)." "Increasing the size of all fields of the DCI" may mean "appending 0 or 1 to each of the MSB and LSB."

The BWP in which the terminal operates may be switched from the BWP #1 to the BWP #2, and the bandwidth of the BWP #2 may be larger than the bandwidth of the BWP #1. In this case, the terminal may interpret (e.g., identify) the frequency resources of the PUSCH belonging to the BWP #2 based on the field(s) of the DCI received in the BWP #1, and bit(s) (e.g., 0 or 1) necessary for indicating frequency resources of the PUSCH belonging to the BWP #2 may be prepended or appended to the corresponding field. The BWP in which the terminal operates may be switched from the BWP #1 to the BWP #2, and the bandwidth of the BWP #1 may be smaller than the bandwidth of the BWP #2. In this case, the terminal may interpret (e.g., identify) the frequency resources of the PUSCH belonging to the BWP #2 based on the field(s) of the DCI received in the BWP #1, and may ignore unnecessary bit(s) (e.g., MSB or LSB) for indicating the frequency resources of the PUSCH belonging to the BWP #2 among the bits of the corresponding field. That is, the terminal may identify frequency resources of the PUSCH belonging to the BWP #2 by interpreting the MSB or LSB of the field indicating the frequency resources of the PUSCH belonging to the BWP #1.

The structure of the bit string indicating the frequency resources of the PUSCH in the unlicensed band may be different from that of the bit string indicating the frequency resources of the PUSCH in the licensed band. The information indicating the frequency resources of the PUSCH in the unlicensed band may indicate the LBT subband and the PUSCH interlace. The frequency resources of the PUSCH in the licensed band may be interpreted from one bit string.

In a proposed method, the UL grant may include the bit string indicating the frequency resources of the PUSCH of the unlicensed band, and the bit string may include a first bit string indicating the LBT subband and a second bit string indicating the PUSCH interlace. Bit(s) (e.g., 0 or 1) may be prepended to each of the first bit string and the second bit string. The bit(s) prepended to each of the first bit string and the second bit string may be an MSB or LSB. Alternatively, the LSB or MSB in each of the first bit string and the second bit string may be used. Alternatively, a third bit string may be generated by concatenating the first bit string and the second bit string. The concatenation order of the bit strings may be "first bit string→second bit string" or "second bit string→first bit string". Bit(s) may be prepended or appended to the third bit string. The bit(s) prepended or appended to the third bit string may be the MSB or LSB. The LSB or MSB may be used in the third bit string. The bit string may mean a bit map, and one bit of the bit string may indicate one LBT subband or one PUSCH interlace. Alternatively, the entire bit string may be the index(es) of the LBT subband(s) or the index(es) of the PUSCH interlace(s).

The BWP #1 may be included in one LBT subband (e.g., LBT subband having a size of 20 MHz). In this case, the UL grant may not include the bit string indicating the LBT subband to which the PUSCH transmitted in the BWP #1 is allocated. The frequency resources of the PUSCH may be indicated only by the bit string of the PUSCH interlace.

When the BWP #2 is included in one LBT subband, the frequency resources of the PUSCH which is transmitted in the BWP #2 may be indicated by the bit string of the PUSCH interlace. Here, the length of the bit string of the PUSCH interlace may vary. When the subcarrier spacing $\Delta f_1$ of the BWP #1 is larger than the subcarrier spacing $\Delta f_2$ of the BWP #2, the number of PUSCH interlaces in the BWP #2 may be less than the number of PUSCH interlaces in the BWP #1. Accordingly, the terminal may omit some bit(s) from the bit string of the PUSCH interlace included in the UL grant received in the BWP #1, and may identify the frequency resources of the PUSCH in the BWP #2 by interpreting the omitted bit string.

For example, when $\Delta f_1$ is 15 kHz, the bit string of the PUSCH interlace may consist of 10 bits or 6 bits. When $\Delta f_2$ is 30 kHz, the bit string of the PUSCH interlace may consist of 5 bits. The terminal may ignore 5 MSBs in the bit string having a size of 10 bits, and may identify the frequency resources of the PUSCH in the BWP #2 by interpreting the remaining 5 LSBs. Alternatively, the terminal may ignore 1 MSB in the bit string having a size of 6 bits, and may identify the frequency resources of the PUSCH in the BWP #2 by interpreting the remaining 5 LSBs.

When $\Delta f_2$ is greater than $\Delta f_1$, the terminal may generate an extended bit string by prepending preconfigured bit(s) (e.g., 0 or 1) to the bit string of the PUSCH interlace included in the UL grant received in the BWP #1, and identify the frequency resources of the PUSCH in the BWP #2 by interpreting the extended bit string. For example, when $\Delta f_1$ is 15 kHz, the bit string of the PUSCH interlace may consist of 5 bits. When $\Delta f_2$ is 30 kHz, the bit string of the PUSCH interlace may consist of 10 bits or 6 bits.

The terminal may generate an extended bit string by prepending 5 bits to the bit string having a size of 5 bits, and identify the frequency resources of the PUSCH in the BWP #2 by interpreting the extended bit string having a size of 10 bits. Alternatively, the terminal may generate an extended bit string by prepending one bit to the bit string having a size of 5 bits, and identify the frequency resources of the PUSCH in the BWP #2 by interpreting the extended bit string having a size of 6 bits.

Meanwhile, the BWP #1 and/or BWP #2 may be included in a plurality of LBT subbands. When the BWP #1 belongs to one LBT subband, the bit string indicating the frequency resources of the PUSCH of the BWP #1 may not include the bit string of the LBT subband. In order to indicate the frequency resources of the PUSCH in the BWP #2, the bit string included in the UL grant transmitted in the BWP #1 may include the bit string of the LBT subband. In a proposed method, the terminal may interpret a portion of the bit string, included in the UL grant received in the BWP #1, indicating the frequency resources of the PUSCH as the bit string of the LBT subband to which the BWP #2 belongs, and interpret the remaining bit string as the bit string of the PUSCH interlace which is transmitted in the BWP #2. Here, the bit string of the LBT subband may be a bitmap, the number of bits included in the bitmap may be equal to the number of LBT subbands in the BWP #2, and the remaining bit string may be used to indicate the PUSCH interlaces of the BWP #2. The remaining bit string may not indicate all combinations of the PUSCH interlaces of the BWP #2. The terminal may generate an extended bit string by prepending bit(s) (e.g., 0 or 1) to the bit string indicating the PUSCH interlaces of the BWP #2.

The above-described method may be applied even when the number of LBT subbands included in the BWP #2 is larger or smaller than the number of LBT subbands included in the BWP #1. A portion of the entire bit string, which is included in the UL grant transmitted in the BWP #1, indicating the frequency resource of the PUSCH may be used first to indicate the LBT subbands of the BWP #2, and the remaining bit string may be used as the bit string of the PUSCH interlace of the BWP #2. Therefore, based on the bit string included in the UL grant transmitted in the BWP #1, the LBT subband of the BWP #2 may always be correctly represented using enough bit(s). Because the remaining bit string represents the PUSCH interlaces, the bit string may not indicate all combinations of the PUSCH interlaces in specific cases. The terminal may generate an extended bit string by prepending bit(s) (e.g., 0 or 1) to the bit string indicating the PUSCH interlaces of the BWP #2. Alternatively, the terminal may generate a reduced bit string by using the MSB or LSB among the bit string indicating the PUSCH interlaces of BWP #2. When the index of the BWP is given, the number of LBT subbands (e.g., length of the bit string) including BWP #1 and BWP #2 may be derived based on the bandwidth of the BWP having the index.

Method of Adjusting the Size of DCI

The base station may perform a resource allocation operation for the licensed band and a resource allocation operation for the unlicensed band using a carrier aggregation (e.g., frequency aggregation) scheme. The carrier in which a DCI including resource allocation information of a data channel is transmitted may be the same as the carrier in which the data channel scheduled by the corresponding DCI is transmitted. This scheme may be referred to as a 'self-scheduling scheme'. Alternatively, the carrier in which the DCI including the resource allocation information of the data channel is transmitted may be different from the carrier in which the data channel scheduled by the corresponding DCI is transmitted. This scheme may be referred to as a 'cross-carrier scheduling scheme'.

When the cross-carrier scheduling scheme is used, the carrier in which the resource allocation information for the licensed band is transmitted may be the same as the carrier in which the resource allocation information for the unlicensed band is transmitted. The DCI may further include a field indicating whether the resource allocation information included in the corresponding DCI is the resource allocation information for the licensed band or the resource allocation information for the unlicensed band. The terminal may receive the DCI from the base station in the corresponding carrier, and may determine whether the resource allocation information included in the DCI is the resource allocation information for the licensed band or the resource allocation information for the unlicensed band based on the field included in the DCI.

In a proposed method, a carrier indication field (CIF) included in the DCI may indicate whether the resource allocation information included in the DCI is the resource allocation information for the licensed band or the resource allocation information for the unlicensed band. The terminal may identify whether the resource allocation information included in the DCI is the resource allocation information for the licensed band or the resource allocation information for the unlicensed band based on the CIF included in the DCI.

The size of resource allocation information for a carrier in a licensed band may be different from the size of resource allocation information for a carrier in an unlicensed band. For example, the size of the DCI including the resource allocation information for the carrier in the licensed band may be different from the size of the DCI including the resource allocation information for the carrier in the unlicensed band. In order to equalize the sizes of the DCIs, preconfigured bit(s) (e.g., 0 or 1) may be prepended to the DCI having the smaller size among the DCIs.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving, from a base station, first control information including first information indicating a physical uplink shared channel (PUSCH) interlace configured in an unlicensed band and second information indicating one or more resource block (RB) sets;
   identifying frequency resources corresponding to the PUSCH interlace in the one or more RB sets; and
   transmitting a PUSCH to the base station using the identified frequency resources in the unlicensed band,
   wherein each of the one or more RB sets includes one or more RBs, the PUSCH interlace is indicated by an index, the index being the first information when a subcarrier spacing of a bandwidth part (BWP) to which the PUSCH interlace belongs is a first value, and the PUSCH interlace is indicated by a bitmap, the bitmap being the first information when the subcarrier spacing is a second value.

2. The operation method according to claim 1, wherein the first information is located prior to the second information within the first control information, a first zero bit is prepended to the first information within the first control information, and a second zero bit is appended to the second information within the first control information.

3. The operation method according to claim 1, further comprising receiving second control information including third information indicating an available RB set from the base station, and the identified frequency resources belong to the available RB set in the one or more RB sets indicated by the first control information.

4. The operation method according to claim 3, wherein the second control information further includes fourth information indicating valid duration.

5. The operation method according to claim 3, wherein, when the second control information further includes fifth information indicating a slot structure and a plurality of pieces of second control information are received from the base station, the plurality of pieces of second control information indicate that a same slot structure is expected by the terminal.

6. The operation method according to claim 1, wherein each of bits included in the bitmap indicates one PUSCH interlace allocated for the terminal.

7. The operation method according to claim 1, wherein the index indicates a combination of one or more PUSCH interlaces allocated for the terminal.

8. The operation method according to claim 7, wherein the index includes information indicating a starting PUSCH interlace among the one or more PUSCH interlaces and information indicating a number of the one or more PUSCH interlaces.

9. The operation method according to claim 1, wherein, when the first information indicates a plurality of PUSCH interlaces, the frequency resources are identified by a combination of the plurality of PUSCH interlaces in the one or more RB sets.

10. The operation method according to claim 1, wherein, when a plurality of RB sets are indicated by the first control information, a guard band which being located between the plurality of RB sets is determined by the terminal.

11. An operation method of a base station in a communication system, the operation method comprising:
   transmitting, to a terminal, first control information including first information indicating a physical uplink shared channel (PUSCH) interlace configured in an unlicensed band and second information indicating one or more resource block (RB) sets;
   identifying frequency resources corresponding to the PUSCH interlace in the one or more RB sets; and
   performing a monitoring operation on the identified frequency resources in the unlicensed band to obtain a PUSCH from the terminal,
   wherein each of the one or more RB sets includes one or more RBs, the first information is a bitmap when a subcarrier spacing of a bandwidth part (BWP) to which the PUSCH interlace belongs is a second value, and each of bits included in the bitmap indicates one PUSCH interlace allocated for the terminal.

12. The operation method according to claim 11, wherein a scheme for indicating the PUSCH interlace depends on the subcarrier spacing.

13. The operation method according to claim 12, wherein the PUSCH interlace is indicated by an index, the index being the first information when the subcarrier spacing is a first value.

14. The operation method according to claim 11, wherein the first information is located prior to the second information within the first control information, a first zero bit is prepended to the first information within the first control information, and a second zero bit is appended to the second information within the first control information.

15. The operation method according to claim 11, further comprising transmitting second control information including third information indicating an available RB set to the terminal, and the identified frequency resources belong to the available RB set in the one or more RB sets indicated by the first control information.

16. The operation method according to claim 13, wherein the index indicates a combination of one or more PUSCH interlaces allocated for the terminal.

17. The operation method according to claim 16, wherein the index includes information indicating a starting PUSCH interlace among the one or more PUSCH interlaces and information indicating a number of the one or more PUSCH interlaces.

* * * * *